United States Patent
Darrow et al.

(10) Patent No.: US 10,810,204 B2
(45) Date of Patent: Oct. 20, 2020

(54) PROVIDING ACCESS TO AN ELECTRONIC MESSAGE ATTACHMENT

(71) Applicant: Microsoft Technology Licensing, LLC, Redmond, WA (US)

(72) Inventors: Alex William Darrow, Seattle, WA (US); Darren Alexander Apfel, Redmond, WA (US); Rebecca Jean Lawler, Seattle, WA (US); Philip Z. Loh, Seattle, WA (US); Jason Andrew Cook, Newcastle, WA (US); Joseph Patrick Masterson, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 593 days.

(21) Appl. No.: 15/444,222

(22) Filed: Feb. 27, 2017

(65) Prior Publication Data
US 2018/0246933 A1    Aug. 30, 2018

(51) Int. Cl.
*G06F 16/20* (2019.01)
*G06F 16/2455* (2019.01)
(Continued)

(52) U.S. Cl.
CPC ........ *G06F 16/2455* (2019.01); *G06F 16/248* (2019.01); *G06F 16/252* (2019.01);
(Continued)

(58) Field of Classification Search
None
See application file for complete search history.

(56) References Cited

U.S. PATENT DOCUMENTS

| 6,405,225 B1 | 6/2002 | Apfel et al. |
| 7,243,298 B2 | 7/2007 | Yozell-Epstein et al. |

(Continued)

FOREIGN PATENT DOCUMENTS

| CN | 103188128 A | 7/2013 |
| EP | 2565831 A1 | 3/2013 |

OTHER PUBLICATIONS

Chhatrapati, Dipti, "Microsoft Graph Api—A Single Stop for Your Cloud Solution", http://sharepointrun.com/microsoft-graph-api-a-single-stop-for-your-cloud-solution/, Published on: Feb. 2, 2016, 12 pages.

(Continued)

*Primary Examiner* — Kristopher Andersen

(57) ABSTRACT

Access to attachments of electronic messages and information associated with the electronic messages to applications external to a messaging application is provided. A message including an attachment is received via a messaging application, and a relationship connecting the message to the attachment is stored in a graph database. When a request is made to display a file list, an API is used to interact with the graph database. Attachments that meet a criterion associated with the file list and associated metadata are included in the list. Responsive to a selection to open an attachment, a productivity application communicates with the messaging application to retrieve the attachment and associated messages, and displays the attachment in a content display region and associated messages and messaging application functionalities in a communications pane in a single productivity application user interface.

20 Claims, 26 Drawing Sheets

(51) Int. Cl.
  *H04L 12/58* (2006.01)
  *G06F 16/248* (2019.01)
  *G06F 16/25* (2019.01)
  *G06F 16/901* (2019.01)
  *G06Q 10/10* (2012.01)
  *G06F 16/90* (2019.01)

(52) U.S. Cl.
  CPC ....... *G06F 16/9024* (2019.01); *G06Q 10/107* (2013.01); *H04L 51/04* (2013.01); *H04L 51/08* (2013.01)

(56) References Cited

U.S. PATENT DOCUMENTS

| | | |
|---|---|---|
| 7,818,678 B2 | 10/2010 | Massand |
| 7,865,815 B2 | 1/2011 | Albornoz et al. |
| 8,185,591 B1 | 5/2012 | Lewis |
| 8,341,235 B2 | 12/2012 | Kumar |
| 8,775,520 B1 | 7/2014 | Lewis et al. |
| 8,826,148 B2 | 9/2014 | Yuniardi et al. |
| 8,972,495 B1 | 3/2015 | Borna |
| 9,298,783 B2 | 3/2016 | Brezina et al. |
| 9,300,609 B1 | 3/2016 | Beausoleil et al. |
| 9,342,820 B2 | 5/2016 | Vidalenc et al. |
| 9,384,470 B2 | 7/2016 | Lemay et al. |
| 2002/0065849 A1 | 5/2002 | Ferguson et al. |
| 2002/0183044 A1 | 12/2002 | Blackwell et al. |
| 2004/0267871 A1 | 12/2004 | Pratley et al. |
| 2006/0069990 A1 | 3/2006 | Yozell-epstein et al. |
| 2006/0075046 A1 | 4/2006 | Yozell-epstein et al. |
| 2006/0123347 A1 | 6/2006 | Hewitt et al. |
| 2007/0011258 A1 | 1/2007 | Khoo |
| 2007/0233791 A1 | 10/2007 | Sylthe et al. |
| 2008/0046518 A1 | 2/2008 | Tonnison et al. |
| 2008/0120360 A1 | 5/2008 | Dumitru et al. |
| 2009/0030872 A1 | 1/2009 | Brezina et al. |
| 2009/0063648 A1 | 3/2009 | Malik et al. |
| 2009/0177754 A1 | 7/2009 | Brezina et al. |
| 2009/0319618 A1 | 12/2009 | Affronti et al. |
| 2010/0005398 A1 | 1/2010 | Pratley et al. |
| 2010/0017404 A1 | 1/2010 | Banerjee et al. |
| 2010/0115401 A1 | 5/2010 | Nordine et al. |
| 2011/0252098 A1 | 10/2011 | Kumar |
| 2012/0192055 A1 | 7/2012 | Antebi et al. |
| 2012/0278402 A1 | 11/2012 | Limont et al. |
| 2012/0284618 A1 | 11/2012 | Bailor et al. |
| 2012/0284639 A1 | 11/2012 | Yuniardi et al. |
| 2015/0169599 A1 | 6/2015 | Burnett et al. |
| 2015/0193100 A1 | 7/2015 | Strode et al. |
| 2015/0200885 A1 | 7/2015 | Sharp et al. |
| 2015/0269242 A1 | 9/2015 | Dey et al. |
| 2015/0277724 A1 | 10/2015 | Masterson et al. |
| 2015/0277725 A1 | 10/2015 | Masterson et al. |
| 2015/0281148 A1 | 10/2015 | Masterson et al. |
| 2015/0281149 A1 | 10/2015 | Masterson et al. |
| 2015/0281150 A1 | 10/2015 | Masterson et al. |
| 2015/0347368 A1 | 12/2015 | Carlen et al. |
| 2016/0283051 A1 | 9/2016 | Masterson et al. |
| 2017/0078343 A1 | 3/2017 | Qiu et al. |
| 2017/0206545 A1 | 7/2017 | Gupta et al. |

OTHER PUBLICATIONS

"Your Documents Online, Any Device, Anywhere", https://quip.com/features/documents, Retrieved on: Dec. 2, 2016, 6 pages.

Gabe, "Slack for Collaboration", http://www.macdrifter.com/2014/02/slack-for-collaboration.html, Published on: Feb. 20, 2014, 15 pages.

"See files others have shared with you", https://support.office.com/en-us/article/See-files-others-have-shared-with-you-e0476dc7-bf2f-4203-b9ad-c809578b03e7, Retrieved on: Dec. 2, 2016, 4 pages.

Mathe, Olof, "Feature Spotlight: Attachment Previews", Retrieved from https://mixmax.com/blog/feature-spotlight-attachment-previews, Feb. 17, 2015, 5 Pages.

"International Search Report and Written Opinion Issued in PCT Application No. PCT/US2018/019070", dated Apr. 18, 2018, 13 Pages.

Sarah, Perez, "Gmail Users No Longer Need to Download Attachments, as Google Drive Gets Baked Into the Inbox", Retrieved from https://techcrunch.com/2013/11/12/gmail-users-no-longer-need-to-download-attachments-as-google-drive-gets-baked-into-the-inbox/, Nov. 12, 2013, 5 Pages.

"International Search Report and Written Opinion Issued in PCT Application No. PCT/US2018/019071", dated Apr. 6, 2018, 12 Pages.

Tamme, et al., "Improving Email Management", In Proceedings of International Conference on Advances in Information Mining and Management, Oct. 23, 2011, pp. 67-72.

"Non-Final Office Action Issued in U.S. Appl. No. 15/444,250", dated Mar. 6, 2019, 24 Pages.

"Final Office Action Issued in U.S. Appl. No. 15/444,250", dated Sep. 16, 2019, 26 Pages.

"Non Final Office Action Issued in U.S. Appl. No. 15/444,250", dated Dec. 20, 2019, 30 Pages.

Productivity App UI 140

File  Home  Insert  Design  Page Layout  References  Mailings  Review  Format  ✎ Tell me what you want to do Modern Design & Architecture — Alexis Darrows

School of Architecture

The built environment

Mauris et orci. Aenean nec lorem. In porttitor. Donec laoreet nonummy augue.
Suspendisse dui purus, scelerisque at, vulputate vitae, pretium mattis, nunc. Mauris eget neque at sem venenatis eleifend. Ut nonummy. Fusce aliquet pede non pede. Suspendisse dapibus lorem pellentesque magna. Integer nulla. Donec blandit feugiat ligula. Donec hendrerit, felis et imperdiet euismod, purus ipsum pretium metus, in lacinia nulla nisl eget sapien.
Donec ut est in lectus consequat consequat. Etiam eget dui. Aliquam erat volutpat. Sed at lorem in nunc porta tristique. Proin nec augue. Quisque aliquam tempor magna.

Pellentesque habitant morbi tristique senectus et netus et malesuada fames ac turpis egestas. Nunc ac magna.
Maecenas odio dolor, vulputate vel, auctor ac, accumsan id, felis. Pellentesque cursus sagittis felis. Pellentesque porttitor, velit lacinia egestas auctor, diam eros tempus arcu, nec vulputate augue magna vel risus. Cras non magna vel ante adipiscing rhoncus.
Vivamus a mi. Morbi neque. Aliquam erat volutpat. Integer ultrices loborits eros.
Pellentesque habitant morbi tristique senectus et netus et malesuada fames ac turpis egestas. Proin semper, ante vitae sollicitudin posuere, metus quam iaculis nibh, vitae Page 1 of 22   23,189 Words

MailApp
Victoria University Paper

Brad Jackerson
Mon 9:45p
You ⌄
⇪ Uploading to NetShare — 308

Hey Alexis,

Here is the paper I was talking about. When you get the chance can you take a look at pages 11-15 and tell me what you think? I think it applies well to our project and the conclusions the firm comes to really align with our strategy for the TOD.

Thanks,
Brad

Add a message — 210

Message App UI 402

MailApp

File  Home  Sync  View  Tell me what you want to do

New emails  Junk  Delete  Archive  Move  Rules  Categories  Follow up  Store  Evernote  Wounderlist Search this folder Wendy Richards
Small ∧ Favorites
ignite
growth
Joe Healy
Contoso Design
Contoso Managers
Financials ∧ Folders — 404
Inbox
Drafts
Sent Items
Deleted items
Archive
Junk Email
Financials
Marketing
Design
Planning
Caring Iniative
HR
All folders Focused  Other  All Other: New messages  [14]

∨ Today
Carole Polarr                              1
 Re: toyDes Conference       1:15 PM
 Good question kat! :-) It's a workshop for...

Wendy Richards                          5
Team meeting                   1:05 PM
Hi team, let's get together the plan for...

Carole Polarr                              20
Great News! Keynote here we come 12:00 PM
Hey Team! Just thought I'd share some gre...

Carole Polarr                              2
 Team Lunch                  11:30 AM
 Save the date to our lunch!

Wendy Richards                         4
                              11:30 AM
Do you have time to meet and talk about...

∨ Yesterday
Carole Polarr
ToyDes Conference          11:25 AM
Here is the information I mentioned to the...

Joe Heals                                10:00 AM
Can some one share the whitepaper?
Does anybody have the white paper from...

Wendy Richards

406

Great News! Keynote here we come!
Friday, March 25, 2016 11:00 AM - 12:00 PM

Carole Polarr

Hey Team,

Just thought I'd share some great news with you! I just found out that our team is going to be responsible for delivering the key note speech at the annual Rail-volution conference in San Francisco. we're also up for three awards! Pretty exciting isn't it? Thanks for all of your hard work to make this happen!

-Carole

108

Sara Lovelys    110

Railvolution Outline
12kb

This is a great opportunity. I've been working with Carole on the outline already. We will make some updates and send out the latest so you can review it and give us any feedback you'd like for us to incorporate.

Kat Lesson

Thanks for sending this out. I'll get you my feedback by tomorrow.

Add a message

File Finder App UI 502   File List 204

WordProcessingApp

Recent

Yesterday
- Office-Cutlook Deck Strategy
  microloft-my.Pointshare.com > personal > adarrow_microloft_com>_

This Week
- Priority7-HVAC
  microloft.Pointshare.com > sites > refweb > na > Redmond > Facility>_

Last Week
- RS2_Scenario_Acrylic
  microloft.Pointshare.com > teams > osg_core_dep > comp > Shared Do...
- F17 Budget Review Notes
  microloft-my.Pointshare.com > personal > adarrow_microloft_com>_
- Notes from our meeting
  microloft.Pointshare.com > personal > adarrow_microloft_com>_
- Football party flyer
  microloft-my.Pointshare.com > personal > adarrow_microloft_com>_
- Design Sprint
  microloft-my.Pointshare.com > personal > adarrow_microloft_com>_

Older
- Office Lens Email Copy Deck
  microloft.Pointshare.com > teams > odspux > Shared Documents > Ma...
- Football party flyer
  microloft.Pointshare.com > teams > Cutlook DocumentCollaboration>...
- DOCwebfinal
  microloft.Pointshare.com > sites > give > Shared Documents
- UATS
  microloft-my.Pointshare.com > personal > aarrow_microloft_com>_
- Saturn DF Instructions
  microloft.Pointshare.com > teams > saturncommunications > Shared...
- GREEN STORE DESIGN(1)
  microloft-my.Pointshare.com > personal > adarrow_microloft_com>_

110

Alexis Darrows
adarrow@microloft.com
Switch account

Search for online templates

Suggested searches: Business  Personal  Industry  Print  Design Sets  Education  Event

- Blank document
- Take a tour
- Title (Aa) — Single spaced (blank)
- Welcome! — Blog post
- Banded design (blank)
- Title xxxx — Spec design (blank)
- xxxxxxx — Report design (blank) — Student report with cov...
- APA style report (6th ed...) — JANUARY Academic calendar (on... — Weekly assignment cale... — Lesson plan calendar

MOBILE COMPUTING DEVICE

PROVIDING ACCESS TO AN ELECTRONIC MESSAGE ATTACHMENT

BACKGROUND

Electronic messages, such as emails, are commonly used for sharing documents with other individuals. A document attached to a message may be a linked file, where the document is stored in a shared file repository and a link to the document is attached to the message, or may be an embedded file, where the document is copied from its storage location and embedded in the message. Oftentimes, whether an attachment is a linked file or an embedded file, users typically find that sharing a document with another user via email is a simple process that involves transport of the document to the user as well as conversations related to aspects of the document. For example, an email conversation may outline necessary actions required to get an attached document to its final state, or may describe a summary of the information in the document and why it is relevant to those who have received it.

While providing conversations, comments, or feedback in a message related to a document attached to the message is convenient, it can be difficult for a user receiving the message to align portions of the conversation with associated portions of the document. For example, a user may receive a message with an attached document, where the message may include a question or comment about a particular piece of the document. The user may mentally map the conversation to the document, or may use a disconnected solution to facilitate collaboration or to view the question or comment in context with the particular piece of the document. For example, the user may switch back-and-forth between the message and the document, may print the message, or may reduce the size of the UI (user interface) display of the message and the UI display of the document so that both the message and the document can be viewed on the user's screen. As can be appreciated, such workarounds can be time-consuming and inefficient, and require extra processing steps.

Further, a user may want to access a document that was sent to the user as a message attachment. However, locating the document can be difficult because current file view menu options do not expose documents that are provided to the user as message attachments.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Systems, methods, and computer readable devices embodying instructions are provided herein for increased user interaction performance and/or improving computational efficiency by providing access to attachments of electronic messages and information associated with the electronic messages to applications external to a messaging application. In particular, aspects are directed to receiving an electronic message including an attached file via a messaging application, and storing a relationship connecting the electronic message to the attachment in a graph database.

When a request is made to display a file list, an application programming interface (API) is used to interact with the graph database to identify if any attachments received by the user meet a criterion associated with the file list and to retrieve metadata associated with the attachments for display in the file list. When a selection to open an attachment in the file list in a productivity application is received, the productivity application is able to authenticate with the messaging application, retrieve messages associated with the attachment, and download the attachment. The productivity application displays the attachment in a content display region and associated messages in a communications pane in a single productivity application user interface. Further, at least a limited set of messaging application functionalities are provided in the communications pane for enabling the user to add a reply message in a conversation associated with the attachment.

When the user selects to generate a reply message, the attachment is attached to the reply message. Further, the user may select to edit the attachment. When the attachment is an embedded file, an editable attachment copy is created and stored in a message store or in a network share, and the user is enabled to make changes to the file. When the attachment is a linked file, changes made to the file are saved to a master copy of the attachment stored in a network share.

Aspects of the present disclosure enable the user to move freely between an attachment and associated messages, providing a seamless interaction between an attachment and associated messages. Accordingly, the user is enabled to have increased focused time within the attachment file and a conversation view in a single user interface, thus increasing user efficiency. Further, computing efficiency is increased by a reduction of processing steps associated with workarounds prompted by the user to align portions of the conversation with associated portions of the document.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 2A-C illustrate an example user interface (UI) storyboard generated by aspects of the attachment access system showing a scenario where a linked attachment is selected and opened in a productivity application UI and associated message information is displayed in a communications panel in the productivity application UI;

FIGS. 3A-E illustrate an example user interface (UI) storyboard generated by aspects of the attachment access system showing a scenario where an embedded attachment is selected and opened in a productivity application UI and associated message information is displayed in a communications panel in the productivity application UI;

FIGS. 4A-B illustrate an example user interface (UI) storyboard generated by aspects of the attachment access system showing a scenario where an attachment in a message is selectively opened from a messaging application in a productivity application UI and associated message information is displayed in a communications panel in the productivity application UI;

FIGS. 5A-C illustrate an example user interface (UI) storyboard generated by aspects of the attachment access system showing a scenario where an attachment is selected and opened in a productivity application UI, and an option is presented that enables access to and display of associated message(s) in a communications panel in the productivity application UI;

FIGS. 6A-B illustrate an example user interface (UI) storyboard generated by aspects of the attachment access system showing a scenario where a message is added to a conversation through a productivity application UI where an associated attachment is opened;

FIGS. 7A-C illustrate an example user interface (UI) storyboard generated by aspects of the attachment access system showing a scenario where changes are made to a linked file attachment and then a link to the modified linked file attachment is attached in a reply message;

DETAILED DESCRIPTION

Figure 1:
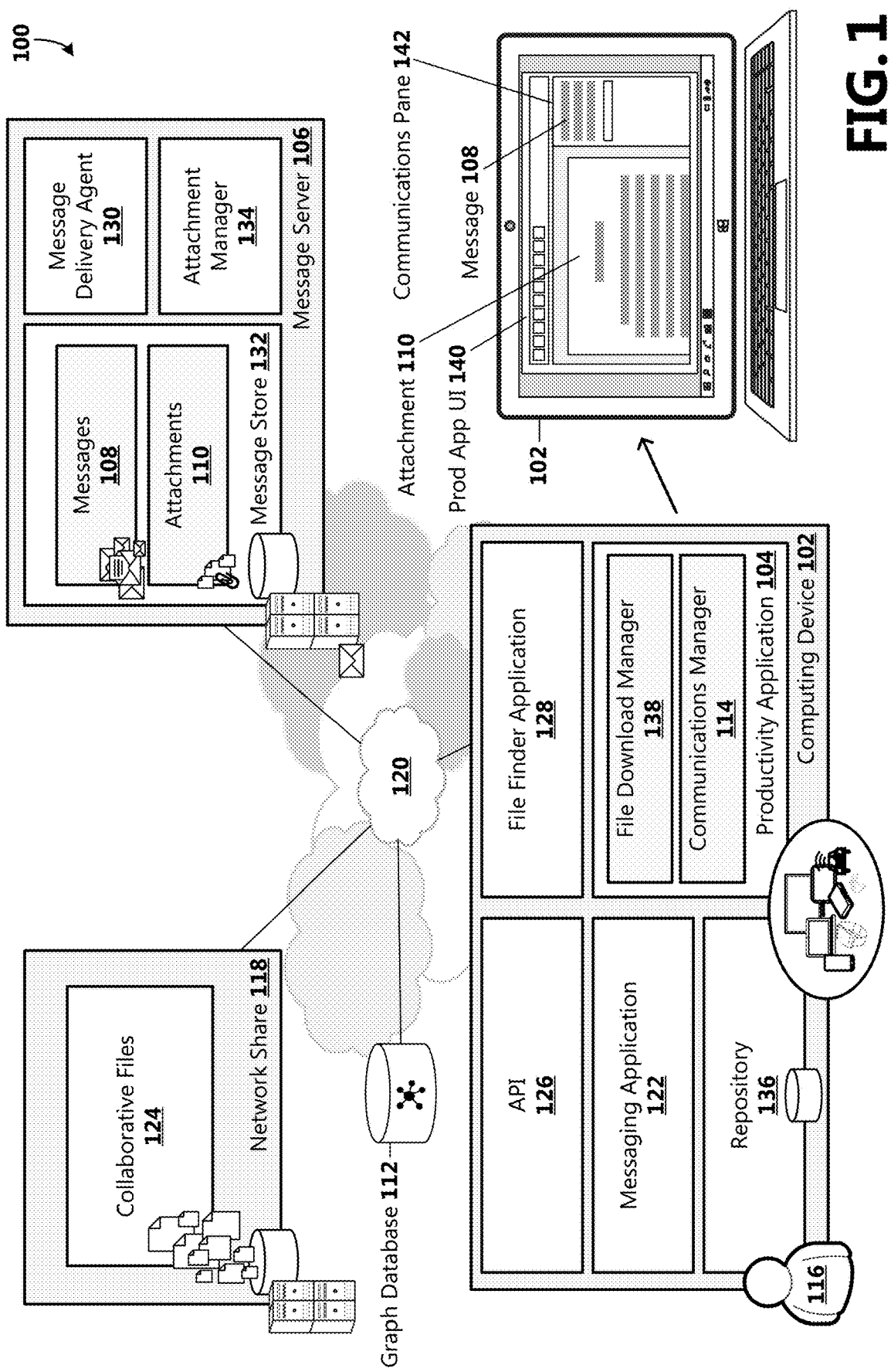
FIG. 1 is a block diagram of an example operating environment including an attachment access system for providing access to attachments of electronic messages and information associated with the electronic messages to applications external to a messaging application.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a system, method, and computer readable device embodying instructions for providing access to attachments of electronic messages and information associated with the electronic messages to applications external to a messaging application. With reference now to FIG. 1, a block diagram of one example operating environment 100 including a system for providing access to attachments of electronic messages and information associated with the electronic messages to applications external to a messaging application is shown. As illustrated, the example environment 100 includes a computing device 102. The computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications for performing a variety of tasks. The hardware of these computing devices is discussed in greater detail in regard to FIGS. 9, 10A, 10B, and 11.

According to examples, the computing device 102 is operative to execute one or more different types of messaging applications 122 to receive, view, interact with, compose, or generate electronic messages 108. For example, messaging applications 122 may include, without limitation, one or more of the following types of applications: an email application, an instant messaging (IM) application, a short messaging service (SMS) application, a multimedia messaging service (MMS) application, a real-time information network (e.g. an interface for the TWITTER® message service, available from Twitter, Inc. of San Francisco, Calif.) application, a social networking application, and the like. The messaging application(s) 122 may be client based or web based. A message server 106 is operative to receive incoming electronic messages 108 from a sending user, and forward outgoing electronic messages 108 for delivery to a recipient user. An electronic message 108 is illustrative of an electronic message that is communicated between one or more users for passing text-based communications and a variety of attached files (i.e., attachments 110), for example, audio files, text files, image files, data files, and the like.

In some examples, an attachment 110 is a linked file, where the file is stored in a shared file repository (e.g., network share 118), and a link to the file is attached to the message 108. For example, the network share 118 is a shared resources server located at an enterprise accessible by various users, or remotely located from the various users at which the users may store and collaborate on various collaborative files 124 (e.g., documents, spreadsheet, images, video, web content, and the like). The network share 118 can be an enterprise-based storage service, or can be a third party cloud storage service that is supported by one or more applications (e.g., messaging application 122, productivity application(s) 104, file finder application 128) executed by the computing device 102.

In other examples, an attachment 110 is an embedded file, where the file is copied from its storage location (e.g., a repository local to the sender, a remote repository, a shared file repository, a third party cloud storage service repository) and is embedded in the message 108. Accordingly, an embedded attachment 110 is stored in a message store 132 (e.g., mailbox) of the message recipient. In some examples, the message server 106 is operative to transmit an electronic message 108 to one or more intended recipients by routing the electronic message 108 to one or more message delivery agents 130. The message server 106 includes or is communicatively attached to a plurality of message delivery agents 130, wherein each message delivery agent 130 is connected to a user's message store 132 (e.g., a mailbox) from which the messaging application 122 is operative to retrieve an electronic message 108. When an attachment 110 is included with the electronic message 108, the messaging application 122 is further operative to retrieve the associated attachment from message store 132. In some examples, the message store 132 is located on a remote device, such as the message server 106, and is accessible to the messaging application 122 over a network 120. In other examples, the message store 132 is located on the recipient user's computing device 102.

An attachment manager 134 is included (as illustrated) or operatively connected to the message server 106. The attachment manager 134 is illustrative of a software module, system, or device operative to process attachments 110 of electronic messages 108. According to an aspect, the attachment manager 134 is configured to identify messages 108 that have an attachment 110, and to store relational information associated with the electronic message 108 and the attachment 110 in a graph database 112. For example, in a graph database 112, entities are presented as nodes and relationships between those entities are presented as edges. According to an aspect, the attachment manager 134 stores, in the graph database 112, a first node representative of the electronic message 108, a second node representative of the attachment 110, and an edge connecting the first node to the second node, wherein the edge represents a relationship between the electronic message 108 and the attached file 110. In some examples, the attachment manager 134 stores additional information and metadata associated with the attachment 110 in the graph database 112. For example, the attachment manager 134 is operative to store metadata associated with the message 108 and attachment 110, such as the sender of the message 108, a subject of the message 108, a date or timestamp of when the message 108 was received, a title of the attachment 110, information associated with whether the attachment is an embedded attachment or a linked attachment, and the like.

According to aspects, the computing device 102 is further operative to execute one or more different productivity applications 104 that allow a user 116 to interact with a variety of content files, for example, to produce information such as documents, presentations, worksheets, databases, charts, graphs, digital paintings or drawings, electronic music, and digital videos. Productivity applications 104 such as word processing applications, slide presentation application, spreadsheet applications, notes-taking applications, desktop publishing applications, drawing applications, image processing and editing applications, video applications, and the like may be operated at the computing device 102 by the user. The user 116 may utilize a productivity application 104 on the computing device 102 for a variety of tasks, which may include, for example, to write, calculate, draw, take and organize notes, organize and prepare presentations, browse web content, make music, and the like. In some examples, a productivity application 104 is a thick client application, which is stored locally on the computing device 102. In other examples, a productivity application 104 is a thin client application (i.e., web application) that resides on a remote server and is accessible over a network 120 or a combination of networks, such as the Internet or an intranet. A thin productivity application 104 may be hosted in a browser-controlled environment or coded in a browser-supported language and reliant on a common web browser to render the application executable on the computing device 102.

According to examples, a graphical user interface (GUI) 140 is provided by the productivity application 104 for enabling the user to interact with functionalities of the application and with file content through manipulation of graphical icons, visual indicators, and the like. According to an aspect and as will be described in greater detail below, the productivity application 104 is operative to provide a GUI 140 for displaying an attachment 110 and at least a portion of a message 108 associated with the attachment 110 in a single user interface. According to another aspect and as will also be described in greater detail below, the productivity application 104 is further operative to provide communication functionalities associated with a messaging application 122 in the GUI 140.

According to aspects, the computing device 102 is further operative to execute one or more file finder applications 128, illustrative of a software module, system, or device operative to search one or more repositories (e.g., local repositories 136, network shares 118, message stores 132) on or communicatively attached to the computing device 102 for files (e.g., collaborative files 124, attachments 110, other documents) responsive to a particular search criterion. In some examples, the search criterion is associated with the file finder application 128.

According to one aspect, the file finder application 128 is an application that a user 116 can utilize to search for and display a list of files (i.e., a file list) that other individuals have shared with the user 116. In one example, the file finder application 128 is operative to search for and display files that an individual has invited the user 116 into. In another example, the file finder application 128 is operative to search for and display files that are attached (e.g., embedded or linked attachments 110) to messages 108 received by the user 116. In some examples, the file finder application 128 discovers files that have been shared with the user 116 according to stored metadata. In other examples, the file finder application 128 discovers files that have been shared with the user 116 by querying the graph database 112 for files connected to the user 116, for example, by a "shared with" edge.

According to another aspect, the file finder application 128 is an application that a user 116 can utilize to search for and display a list of files that the user 116 has most recently used or saved. In some examples, the file list of recent files includes one or more attachments 110 shared with the user 116 via a message 108. According to another aspect, the file finder application 128 is an application that a user 116 can utilize to enter a search criterion for searching for and displaying a list of files that are responsive to the entered criterion. For example, the user 116 may utilize the file finder application 128 to search for files including a particular keyword in the title, files of a specific file type, files saved on a particular date or within a particular time period, etc. According to an aspect, the list of files can include one or more attachments 110 shared with the user 116 via a message 108. In some examples, the file finder application 128 is a stand-alone application. In other examples, the file finder application 128 is integrated with or added onto/into another application, such as a productivity application 104. As should be appreciated, aspects are not limited to the above examples of file finder applications 128. Other file finder application types are possible and are within the scope of the disclosure.

According to an aspect, the file finder application 128 is operative to utilize an API (application programming interface) 126 to query the graph database 122 to identify files, including attachments 110, for inclusion in a particular file list (e.g., files shared with the user 116, recent files, files responsive to a search criterion). According to another aspect, the file finder application 128 is further operative to utilize the API 126 to retrieve and display location or origin information associated with attachments 110. For example, location information can include a repository (e.g., local repositories 136, network shares 118, message stores 132) on or communicatively attached to the computing device 102 where an attachment 110 is stored. Origin information can include an indication of why an attachment 110 is included in a particular file list (e.g., shared with the user 116, recent files, files responsive to a search criterion) that is being displayed by the file finder application 128. In some examples, the indication is text or an icon indicating that a file in the file list is a message attachment 110. In other examples, the indication further indicates whether the attachment 110 is an embedded attachment or a linked attachment.

According to an aspect, the productivity application 104 includes or is operatively connected to a file download manager 138. The file download manager 138 is illustrative of a software module, system, or device operative to enable the productivity application 104 to access attachments 110 stored in a message store 132, such as a mailbox, associated with the user 116. For example, the file download manager 138 allows the productivity application 104 to access and authenticate into the message store 132, and to download a selected attachment 110. According to another aspect, the file download manager 138 is further operative to access, authenticate, and download files, including collaborative files 124 that are stored on a network share 118. For example, when a selection to open an attachment 110 is made, and when the attachment 110 is a linked file and stored on a network share 118, a local copy of a master copy of the attachment 110 (stored on the network share 118) is downloaded to the computing device 102 and opened in the productivity application 104.

When an attachment 110 (or a copy of the attachment 110) is downloaded and opened in the productivity application 104, the user 116 is enabled to interact with the file. For example, various functionalities are provided by the productivity application 104 for allowing the user 116 to edit the attachment file in association with the provided functionality. Some functionalities are tools and settings related to authoring content, and can be activated via various methods. In one example, various selectable functionality controls associated with productivity application 104 tools and settings are arranged in a toolbar provided by the productivity application 104.

According to an aspect, when a linked file attachment 110 is downloaded, and when edits to the local copy are made by the user 116, changes made to the local copy are saved to the master copy residing in the network share 118. According to some examples, when an embedded file attachment 110 is downloaded from the message store 132, and when edits are made to the file by the user 116, the changes made to the file are stored in a copy of the attachment 110. According to one example, an option is presented to the user 116 prior to when an edit is made that enables the user to selectively create and store an editable copy of the attachment 110 in the message store 132. According to another example, an editable copy of the attachment 110 is automatically created and stored in the message store 132. According to another example, an option is presented to the user 116 that enables the user to selectively create and store an editable copy of the attachment 110 in a network share 118.

According to an aspect, the productivity application 104 includes or is operatively connected to a communications manager 114. The communications manager 114 is illustrative of a software module, system, or device operative to access and display an electronic message 108 associated with an attachment 110 opened in the productivity application 104. For example, based on origin information of the attachment 110, the communications manager 114 identifies the electronic message or messages 108 to which the attachment 110 is embedded or linked, authenticates with the messaging application 122, and retrieves the message 108 for display in a communications panel 142 in the productivity application UI 140. In some examples, a single message 108 is associated with an attachment 110. In other examples, a plurality of messages 108 are associated with an attachment 110. For example, a message 108 to which an attachment 110 is embedded or linked may be part of a conversation comprised of a plurality of messages 108.

In some examples, the communications manager 114 identifies one or more electronic messages 108 associated with a linked attachment 110, and authenticates with a network share 118 for retrieving the one or more messages. For example, a message 108 to which an attachment 110 is linked may be associated with one or more conversations between different senders and recipients comprised of a plurality of messages stored in the network share 118.

According to an aspect, when a plurality of messages 108 or conversations are associated with an attachment 110, an activity feed including a history of document changes associated with the attachment 110 or a list of the messages 108 or conversations associated with the attachment 110 are displayed to the user 116, for example, in the communications panel 142 in the productivity application UI 140. The user 116 is enabled to select a particular message 108 or conversation for display in the communications panel 142.

According to an aspect, the productivity application 104, via the communications manager 114, generates a communications panel 142 in the productivity application UI 140, where the message(s) associated with an attachment 110 are displayed. According to another aspect, the communications manager 114 is further operative to provide various messaging application 122 functionalities in the communications panel 142. In some examples, a limited or lightweight set of messaging application functionalities are provided, such as a functionality command for adding a message 108 to a displayed conversation. According to an aspect, when an edit is made to the attachment 110 and a selection is made by the user 116 to add a message 108 (e.g., email, SMS, MMS, instant message, post) or reply to the message or conversation associated with the attachment, the edited file is automatically attached to the message and delivered with the message to the recipient(s).

In other examples, an expand option is provided in the communications panel 142 that enables launching out of the limited conversation experience provided via the productivity application 104 to a more in-depth communication experience via a messaging application 122. For example, the user 116 may want to reply via a meeting request, modify recipients, modify message properties, and the like. According to an aspect, when a selection of the expand option is made, the communications manager 114 is further operative to communicate with the messaging application 122 providing the attachment 110 or that is associated with the attachment type for instructing the messaging application to launch. Further, the communications manager 114 communicates instructions to the messaging application 122 to open the currently displayed message 108 in the messaging application UI. Advantageously, the user 116 is enabled to stay in context with the conversation experience provided via the productivity application 104.

FIGS. 2A-7C shown various aspects of the attachment access system with respect to the various example user interface (UI) storyboards 200, 300, 400, 500, 600, 700 illustrated in the figures. A first storyboard 200 illustrated in FIGS. 2A-D shows a selection of a linked attachment 110 from a file list, and the linked file being opened in a productivity application 104 along with an associated activity feed including the message 108 to which the file is attached.

Figure 2A:
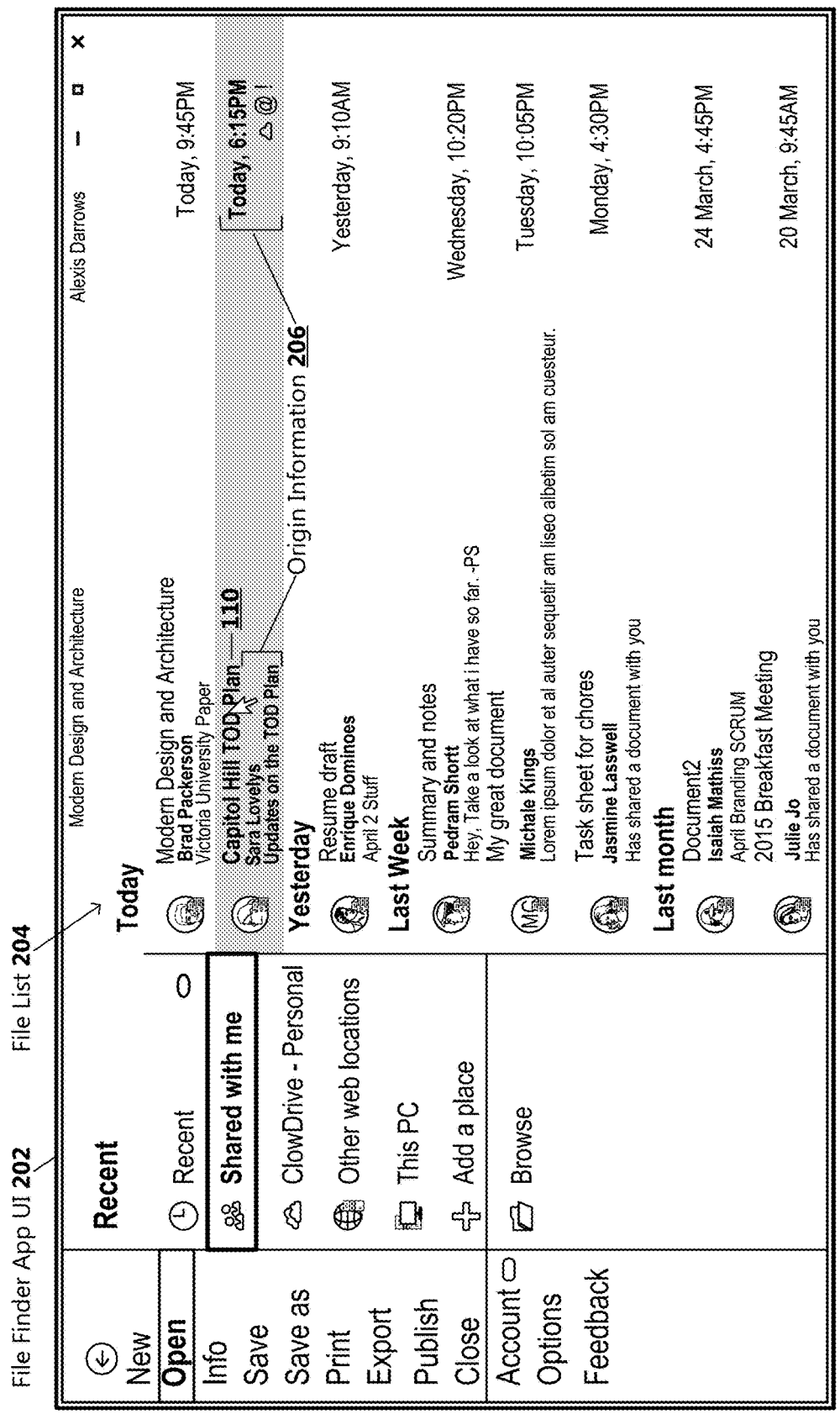

With reference now to FIG. 2A, an example file finder application UI 202 is illustrated including a display of a file list 204 that includes titles of files that have been shared with the user 116. According to an aspect, the file list 204 further includes additional information, such as origin information 206 that indicates to the user 116 why a particular file is included in the file list 204. For example and as illustrated, when a particular file in the file list 204 is an attachment 110, the origin information 206 may include information associated with the message 108 to which the particular file is attached. In some examples, a sender of the message 108 is included in the origin information 206. In other examples, a subject line of the message 108 is included in the origin information 206. In other examples, an indication of whether the attachment 110 is a linked attachment or an embedded attachment is included in the origin information 206. In other examples, a date or time stamp of when the attachment 110 was shared with the user 116 is included in the origin information.

In the illustrated example, the user 116 has selected a file from the file list 204. The selected file is a linked attachment 110 as indicated by the cloud icon in the origin information 206, which reveals that the file is a collaborative file 124 stored in a network share 118, not in the user's message store 132. As should be appreciated, the cloud icon is one example of an indicator of origin of the attachment or indicator of an attachment type. Other indication types are possible and are within the scope of the present disclosure. As mentioned above, the information about attachments 110 is accessible to the file finder application 128 (and other applications, such as one or more productivity applications 104) via the API 126, which the application(s) are operative to use to connect to the graph database 112 to retrieve attachment file information and associated origin information 206. In some examples, the origin information 206 is stored as metadata in another repository 136.

Figure 2B:
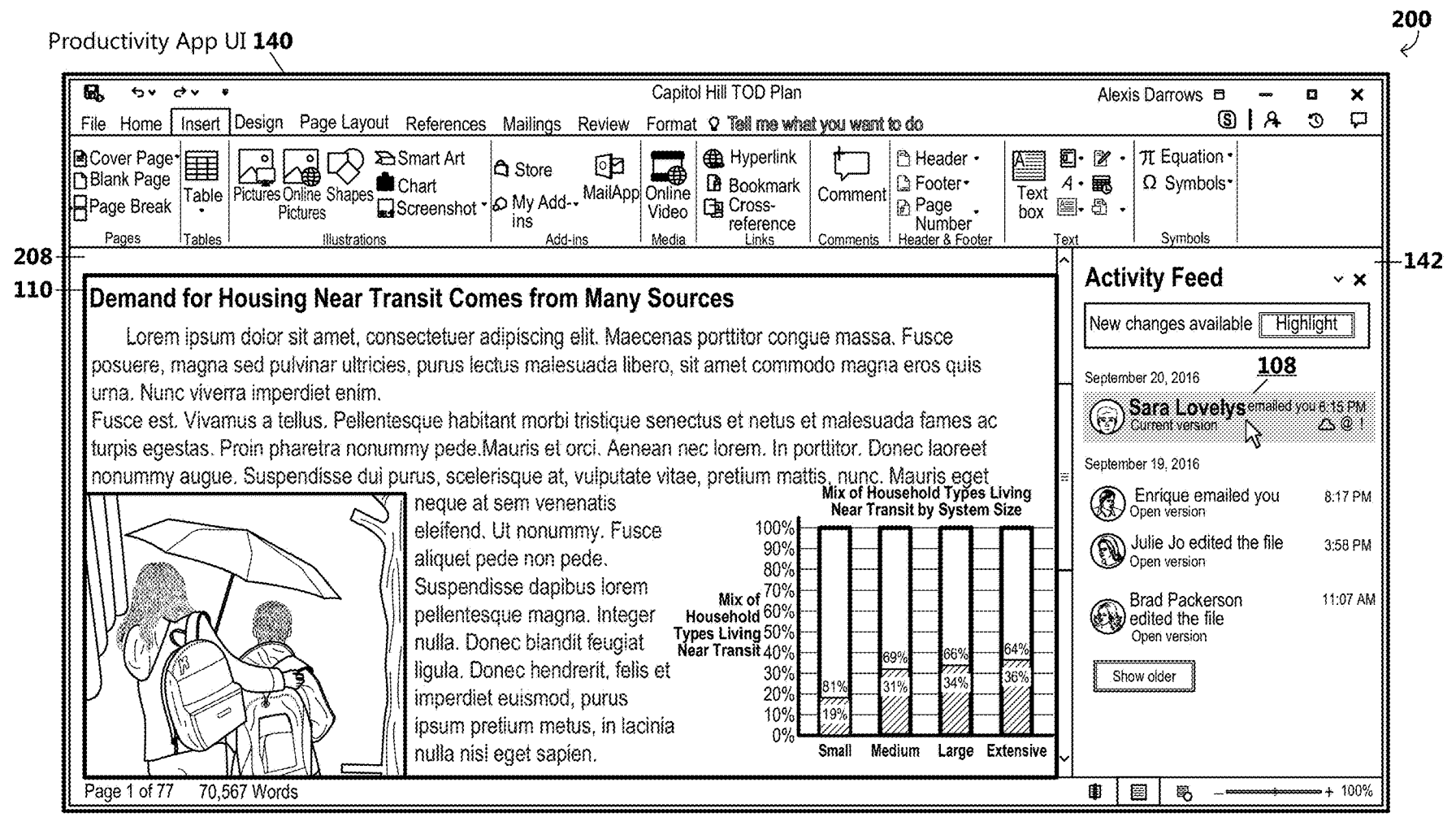

With reference now to FIG. 2B, responsive to the selection of the attachment 110, the attached file is downloaded and displayed in a productivity application UI 140, for example, in a content display area 208. In the illustrated example, the productivity application UI 140 is a word processing application UI. However, as should be appreciated, depending on the attachment file type, the attachment 110 can be opened in a variety of other productivity applications 104.

In the illustrated example, an activity feed associated with the attachment 110 is retrieved and displayed in the communications panel 142 in the productivity application UI 140. The activity feed includes the message 108 associated with the selected attachment 110. According to an aspect and as described above, the productivity application 104 is enabled to connect with the messaging application 122 or the network share 118 via the communications manager 114 to retrieve activity feed or communications information associated with the attachment 110 (e.g., the particular message 108 to which the attachment 110 is attached, other messages in a conversation including the particular message 108, other messages 108 or conversations associated with the attachment 110). In the illustrated example, the user 116 selects the message 108 associated with the displayed attachment 110.

Figure 2C:
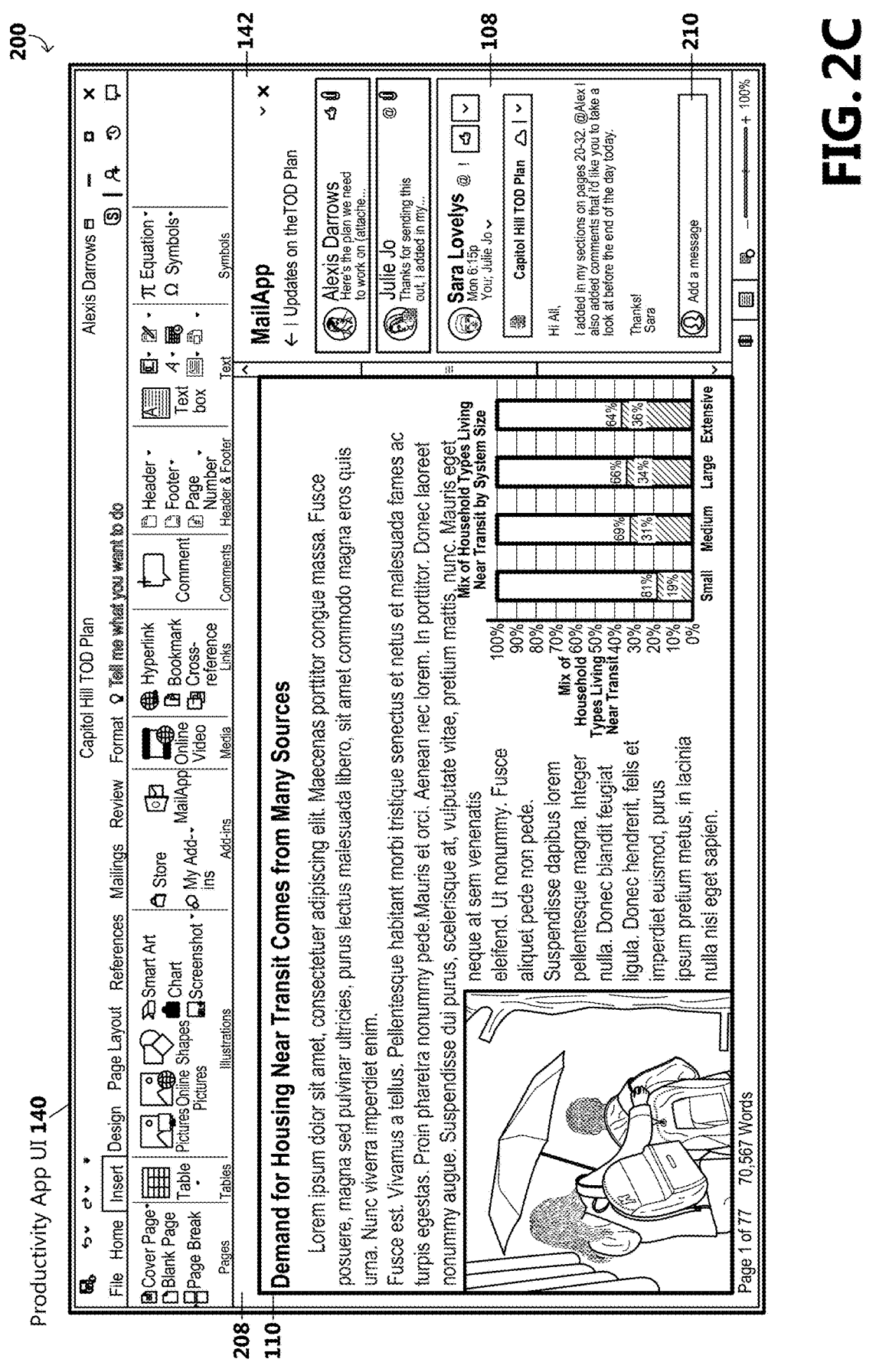

With reference now to FIG. 2C, responsive to a selection of the message 108, the contents of the message 108 are displayed in the communications pane 142. In the illustrated example, the message 108 is an email message. However, as should be appreciated, a message 108 associated with an attachment 110 and displayed in the communications pane 142 can be one of various types of electronic communication message types, such as an SMS, MMS, instant message, real-time information network post, social media post, etc. Further, at least a limited or lightweight set of messaging application functionalities 210 are provided in the communications pane 142, such as a functionality command for adding a message to a displayed conversation or a reply to a displayed message 108.

Figure 3A:
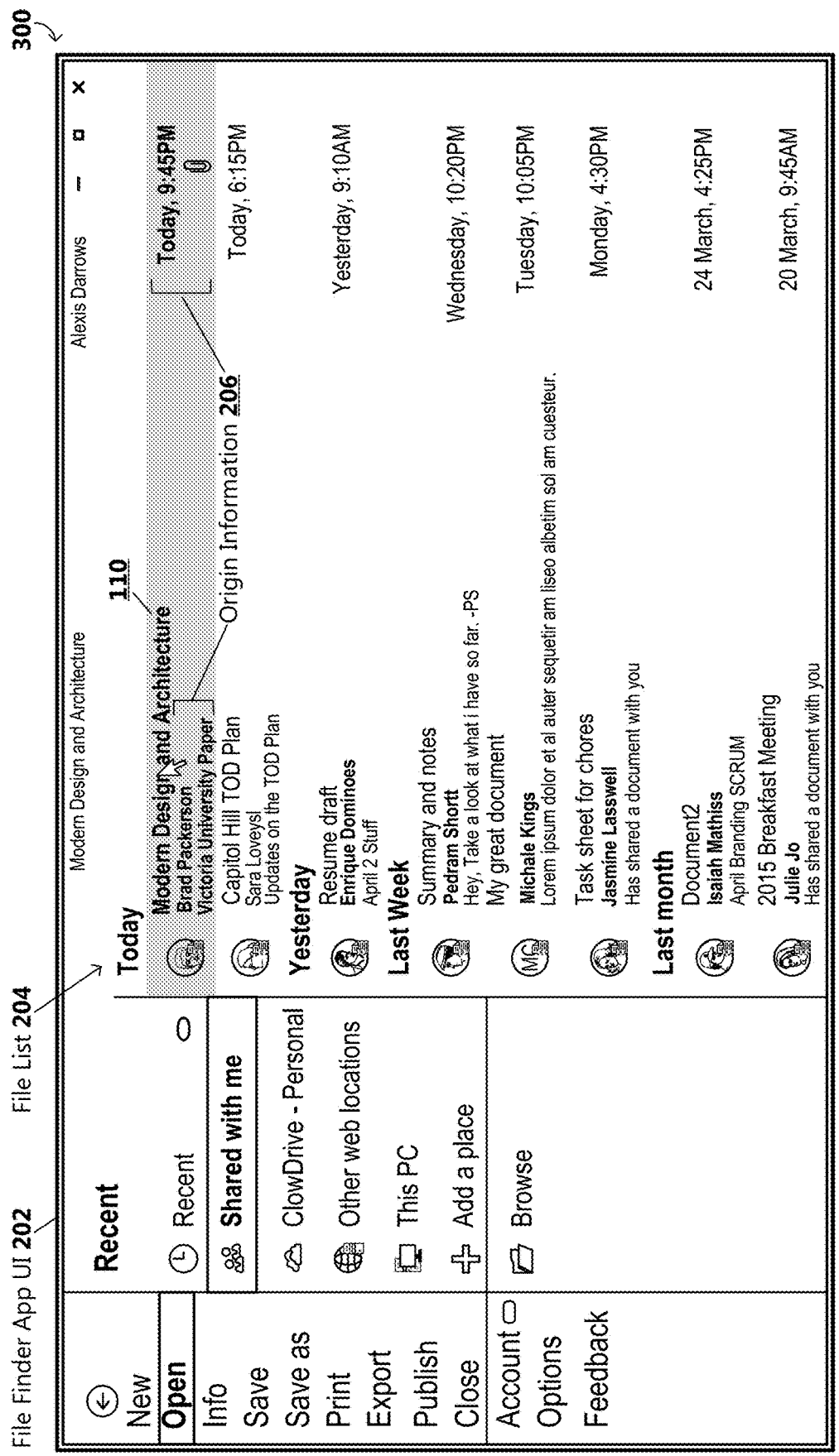

A second storyboard 300 illustrated in FIGS. 3A-E shows a selection of an embedded attachment 110 from a file list 204, and the embedded file being opened in a productivity application 104 along with the associated message 108 to which the file is attached. With reference now to FIG. 3A, the example file finder application UI 202 of FIG. 2A is shown illustrated including a display of the file list 204 of files that have been shared with the user 116. In the illustrated example, the user 116 has selected a file from the file list 204. The selected file is an embedded attachment 110 as indicated by the paperclip icon in the origin information 206, which reveals that the file was embedded in a received message 108 and is stored in the user's message store 132. As should be appreciated, the paperclip icon is one example of an indicator of origin of the attachment or indicator of an attachment type. Other indication types are possible and are within the scope of the present disclosure.

Figure 3B:
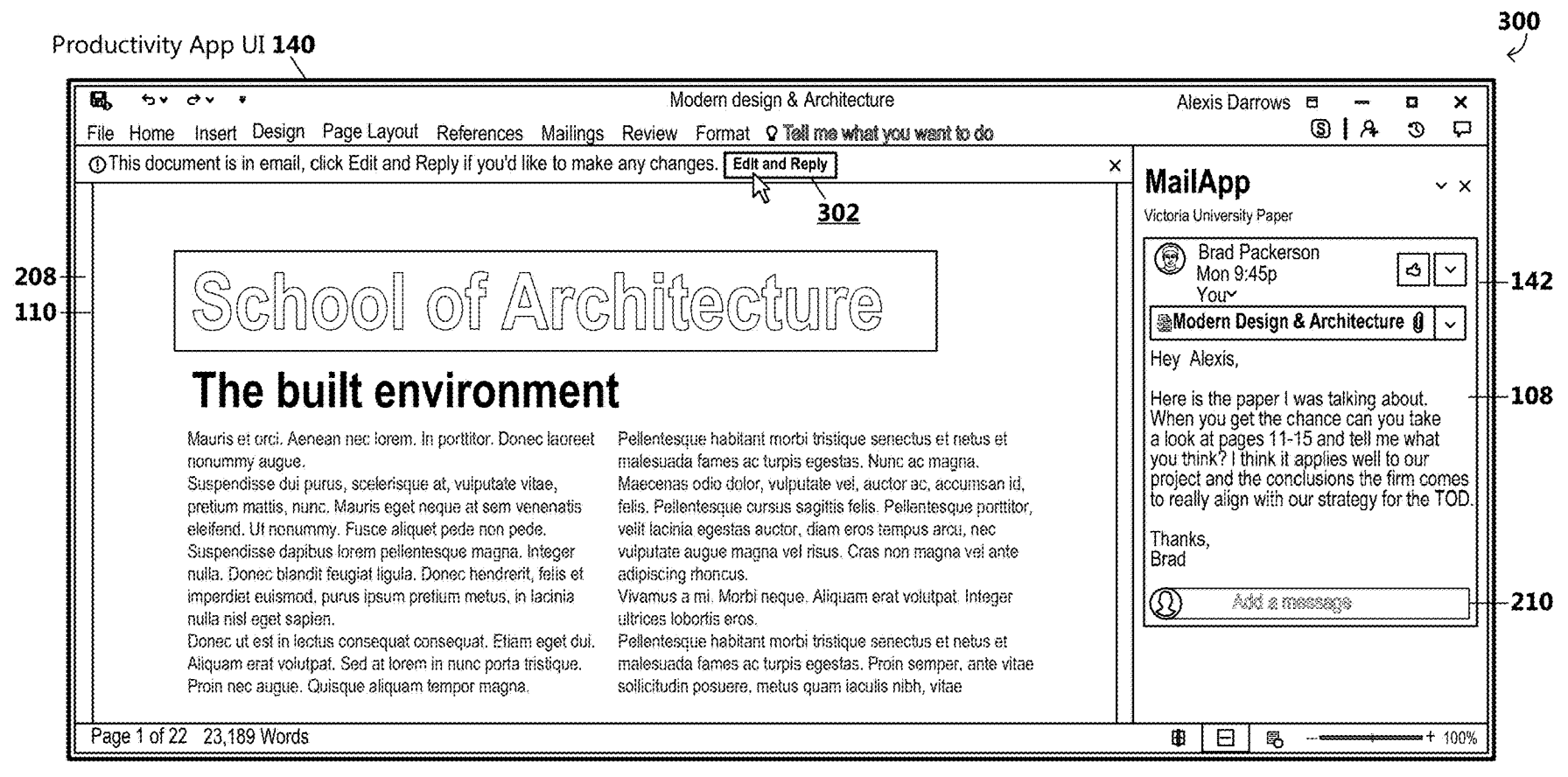

With reference now to FIG. 3B, responsive to the selection of the attachment 110, the embedded file is downloaded from the message store 132 and displayed in the content display area 208 of a productivity application UI 140. In the illustrated example, the productivity application UI 140 is a word processing application UI. However, as should be appreciated, depending on the attachment file type, the attachment 110 can be opened in a variety of other productivity applications 104. As illustrated, a communications pane 142 is additionally displayed in the productivity application UI 140. Although the communications pane 142 is illustrated as being displayed docked to a side edge of the productivity application UI 140, the communications pane 142 can be positioned elsewhere in the productivity application UI 140, such as above or below the content display area 208, or to either side of the content display area 208.

As illustrated, a single message 108 is retrieved from the messaging application 122 and displayed in the communications pane 142. For example, the attachment 110 may be attached to a message 108 that is not part of a multi-message conversation. Further, at least a limited or lightweight set of messaging application functionalities 210 are provided in the communications pane 142, such as a functionality command for replying to the displayed message 108.

In the illustrated example, a notification is provided in the productivity application UI 140 that indicates to the user 116 that the attachment 110 is an embedded file, and thus a read-only document. Further, an edit and reply option 302 is provided, which is shown being selected by the user 116. According to an aspect, when the edit and reply option 302 is selected, an editable copy of the attachment 110 to which the user 116 is enabled to make changes is created. In some examples, the editable copy of the attachment 110 is stored in the message store 132, and is associated with the message 108. For example, the attachment manager 134 stores a relationship of the editable copy of the attachment 110 to the message 108 in the graph database 112. As should be appreciated, provision of the edit and reply option 302 is optional. For example, an editable copy of the attachment 110 may be automatically created and stored in the message store 132 upon opening the attachment 110 in the productivity application 104 or upon receiving an indication of an edit being made to the attachment 110 by the user 116.

Figure 3C:
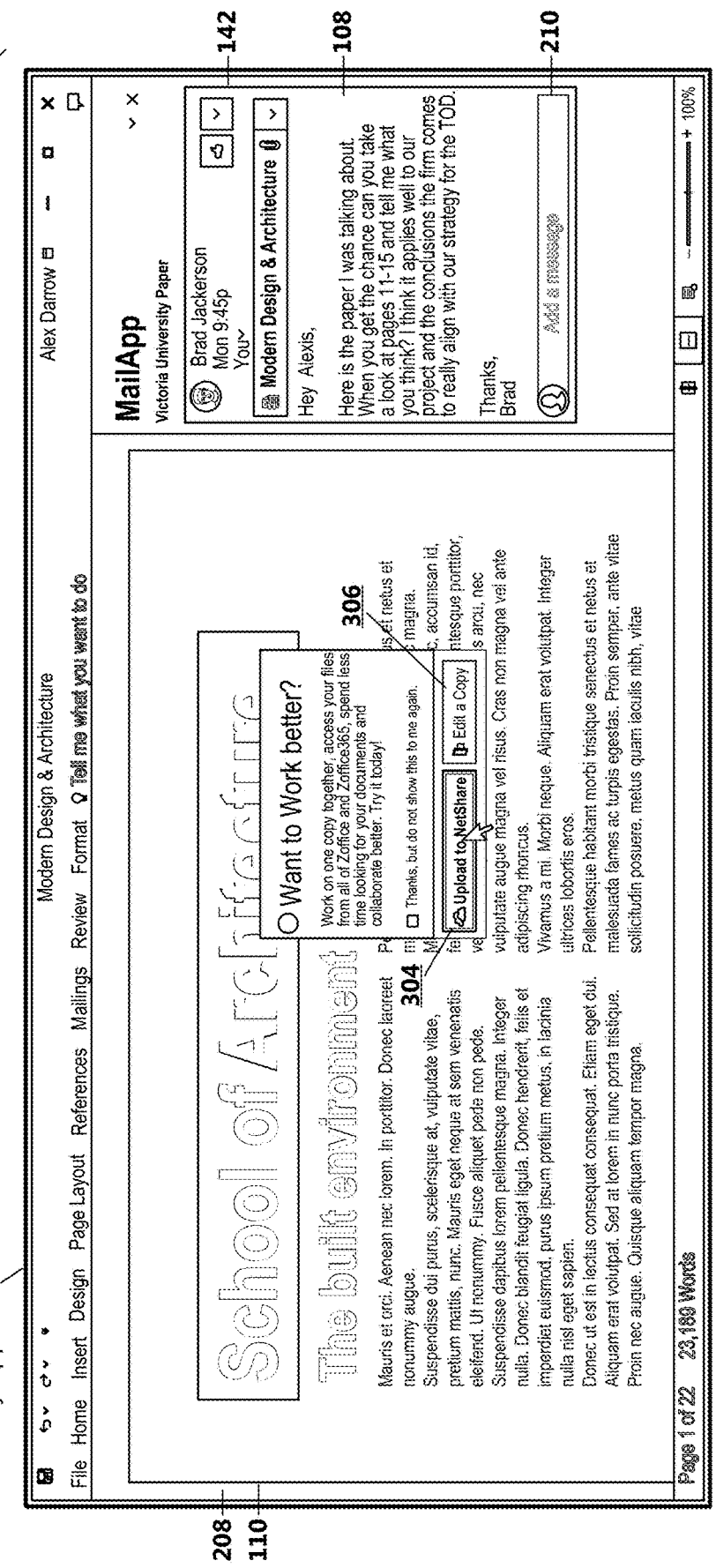
Figure 3E:
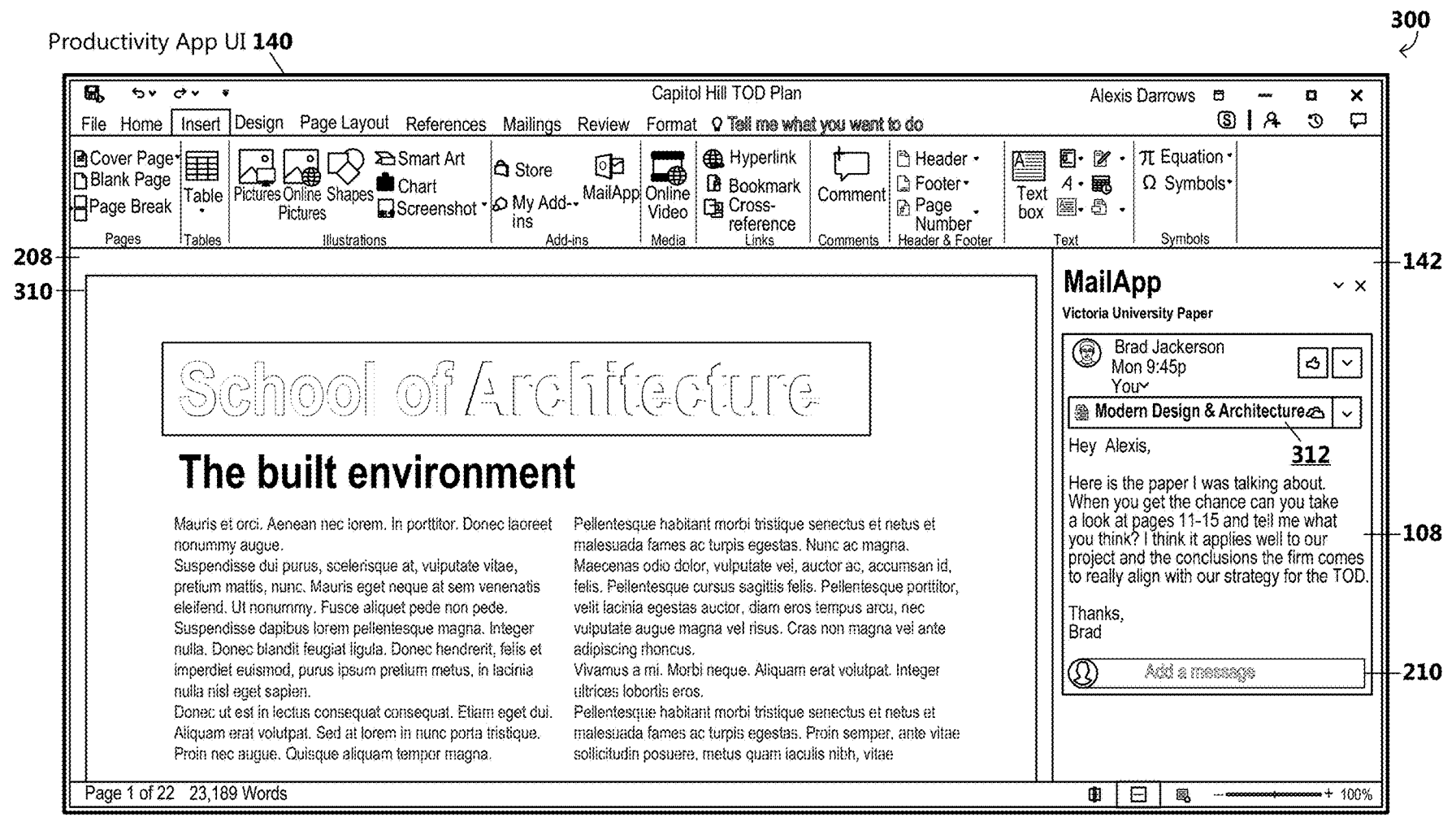

According to other examples and with reference now to FIG. 3C, prior to creating an editable copy of the attachment 110, an upload option 304 is presented to the user 116 that enables the user to select to create and upload a copy of the attachment 110 to a network share 118. Additionally, an edit option 306 can be presented that enables the user 116 to select to create an editable copy of the attachment 110 in the message store 132. As illustrated in FIG. 3C, the user 116 is shown selecting the upload option 304.

Responsive to the selection, a copy of the attachment 110 is uploaded to a network share 118. As illustrated in FIG. 3D, a notification 308 is displayed during the upload that informs the user 116 that the file is being uploaded to the network share 118. Upon completion of the upload, and with reference now to FIG. 3E, the editable attachment copy 310 is provided in the content display area 208, and a link 312 to the uploaded copy of the attachment 110 in the network share 118 is provided in the communications pane 142.

Figure 4B:
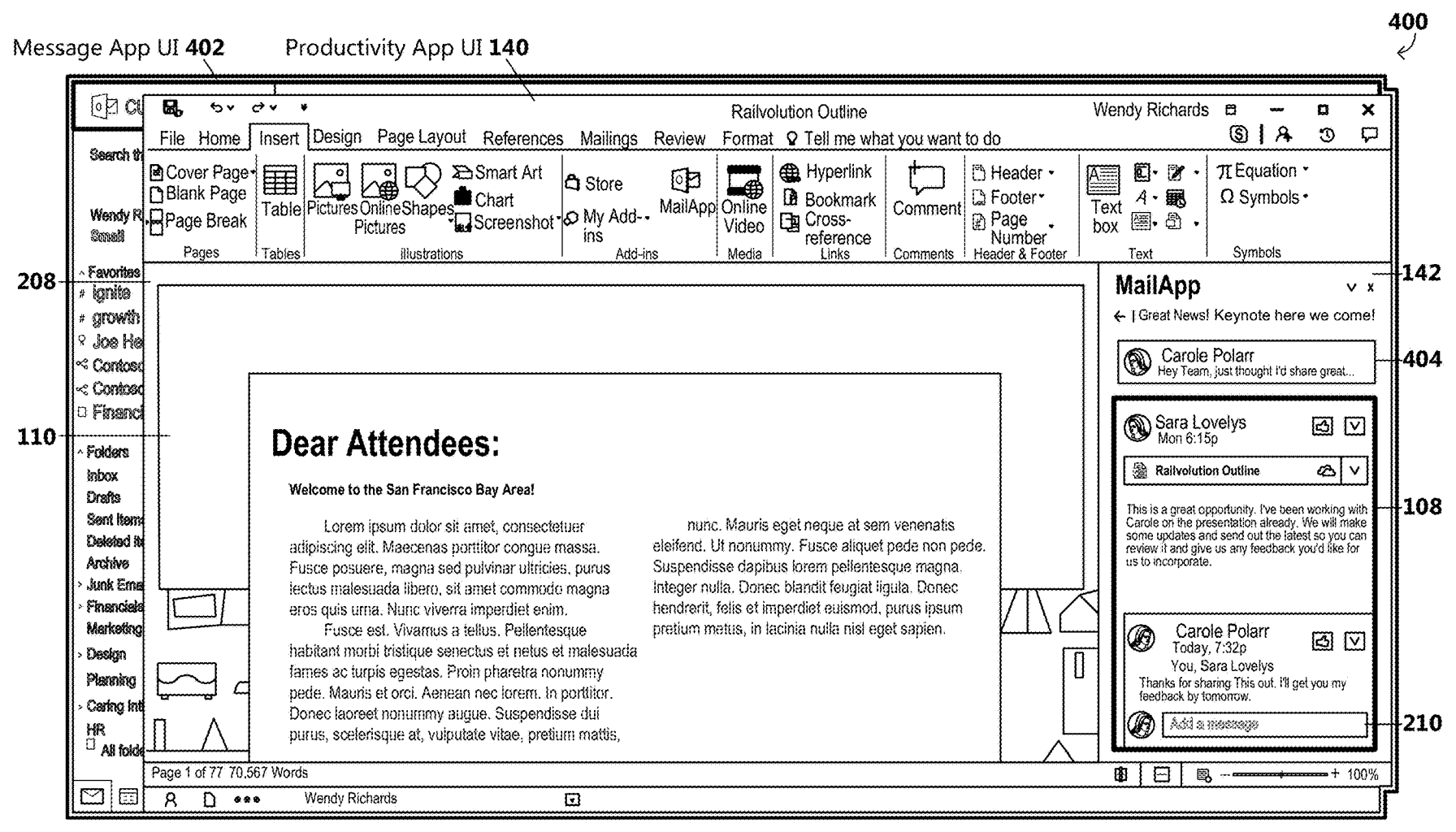

A third storyboard 400 illustrated in FIGS. 4A-B shows a selection of an attachment 110 from a message 108 displayed in a messaging application UI 402, and the selected file being opened in a productivity application 104 along with the associated message 108 and conversation 404 to which the file is attached. With reference now to FIG. 4A, the messaging application 104 in the illustrated example is a mail application. In the example messaging application UI 402, a plurality of messages 108 and conversations 404 that are stored in the user's message store 132 are listed. As illustrated, a conversation 404 is selected from the list, and messages 108 that are included in the conversation 404 are displayed in a preview pane 406 of the messaging application UI 402. Further as illustrated, a message 108 in the conversation 404 includes an attachment 110, and the user 116 selects to open the attachment 110.

With reference now to FIG. 4B, upon receiving the selection to open the attachment 110, the attachment 110 is downloaded and opened in an appropriate productivity application 104. For example, the attachment 110 is opened and displayed in a content display area 208 in the productivity application UI 140. Further, the conversation 404 including the message 108 to which the attachment 110 is attached is displayed in a communications pane 142 in the productivity application UI 140. As illustrated, at least a limited set of messaging application functionalities 210 are provided, such as a functionality command for adding a message 108 to the displayed conversation.

Figure 5B:
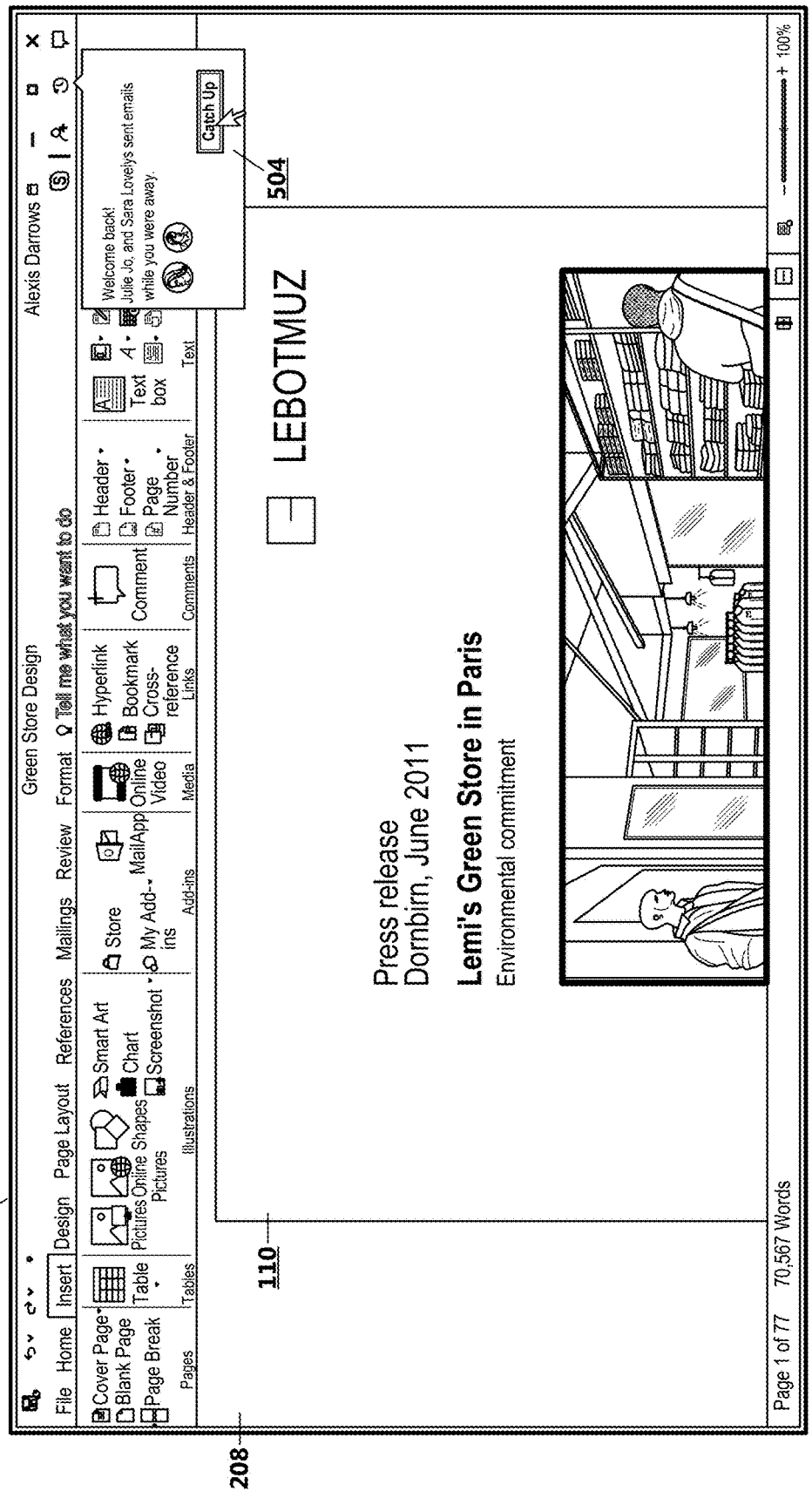
Figure 5C:
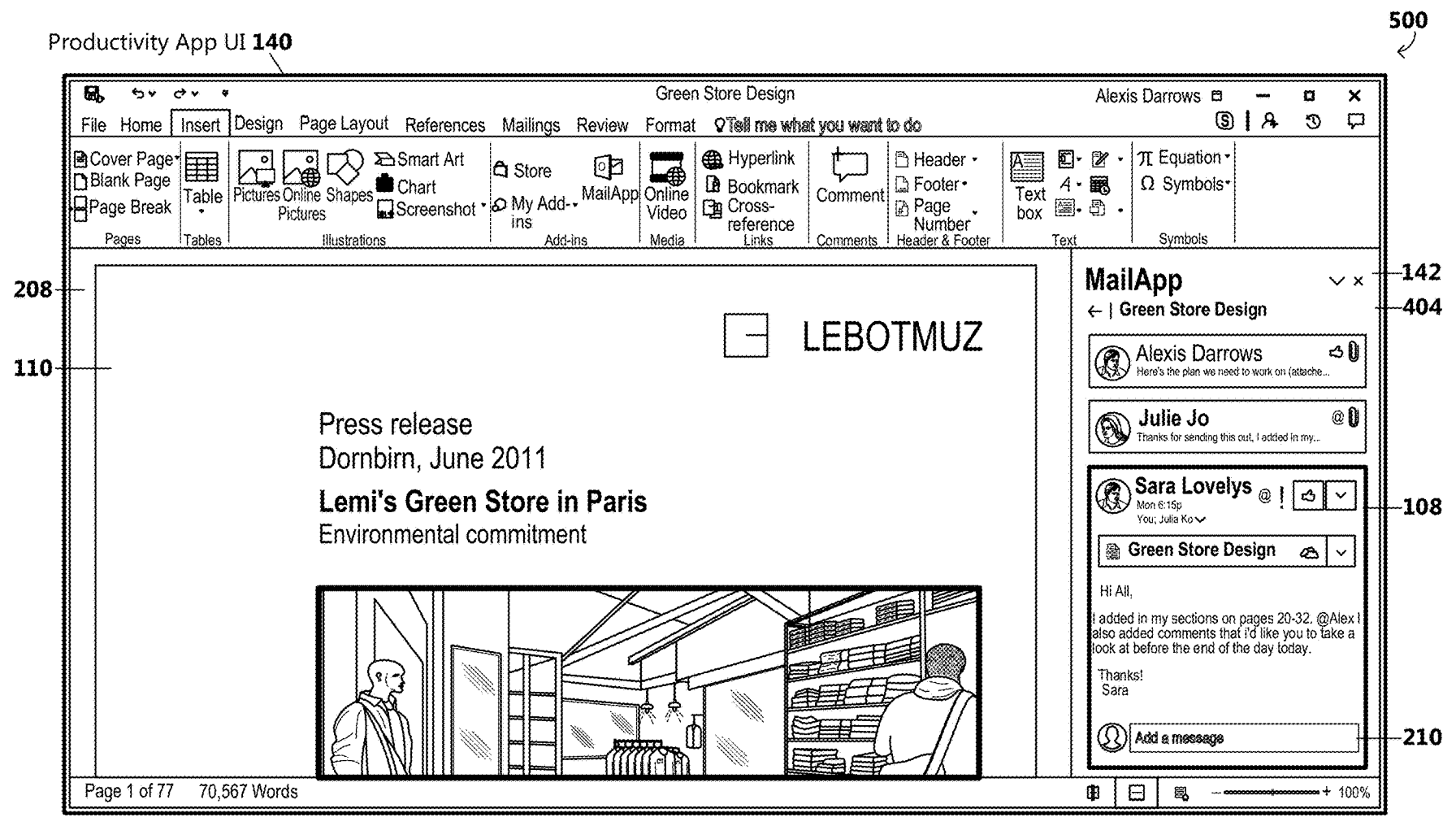

A fourth storyboard 500 illustrated in FIGS. 5A-C shows a selection of an attachment 110 from a file list 204, and the selected file being opened in a productivity application 104. Further, the storyboard 500 shows an option provided to the user 116 to open the associated message 108 and conversation 404 to which the file is attached in a communications pane 142 in the productivity application UI 140. With reference now to FIG. 5A, an example file finder application UI 502 is illustrated including a display of an example file list 204 that includes titles of files that the user 116 has most recently used or saved. The example file list 204 of recent files includes one or more attachments 110 shared with the user 116 via a message 108. Although illustrated as being integrated with or added onto/into a productivity application 104, in other aspects, the file finder application 128 can be a stand-alone application. As shown in FIG. 5A, the user 116 selects a particular file from the file list 204.

Responsive to the selection, and as illustrated in FIG. 5B, the file is opened in the productivity application 104. In the illustrated example, the selected file is an attachment 110. In some examples and as illustrated, when a file is selectively opened and is associated with a message 108 (i.e., the file is an attachment 110), the productivity application 104 presents a communications option 504 that enables the user 116 to selectively open associated messages 108 in a communications pane 142 in the productivity application UI 140. The communications option 504 can include additional information, such as an indication that one or more messages 108 have been received as part of a conversation 404 associated with the attachment 110. As shown in FIG. 5B, the user 116 selects the communications option 504 for accessing and displaying the associated conversation 404 in the productivity application UI 140. In other examples, the associated conversation 404 is automatically displayed in a communications pane 142 in the productivity application UI 140 (e.g., the communications option 504 is not provided).

With reference now to FIG. 5C, via the communications manager 114, the productivity application 104 accesses the message(s) 108 associated with the attachment 110, and displays the message(s) 108 (e.g., the conversation 404) in a communications pane 142. Additionally, a limited set of messaging application functionalities 210 are provided, such as a functionality command for adding a message 108 to the displayed conversation 404.

Figure 6A:
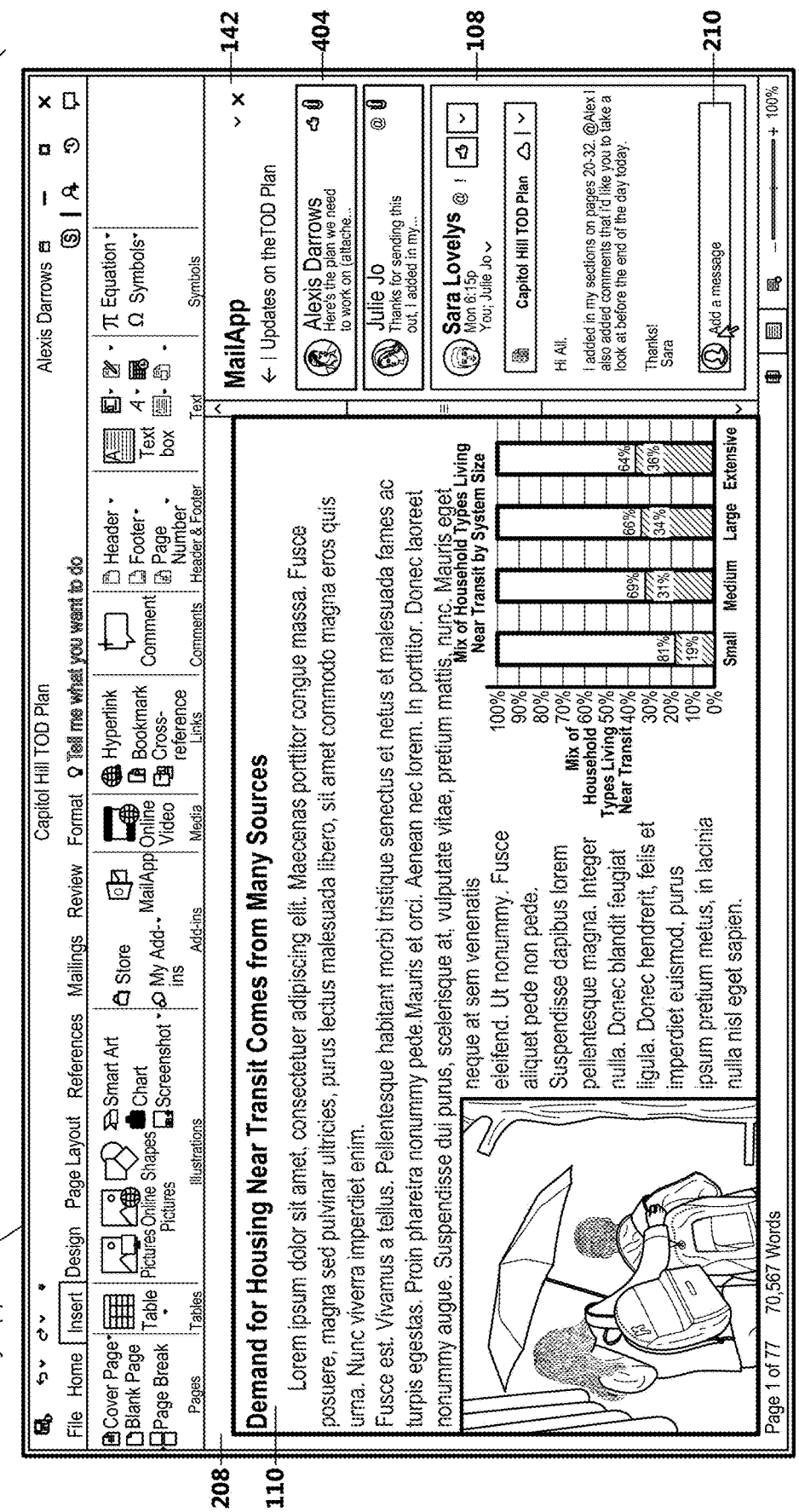
Figure 6B:
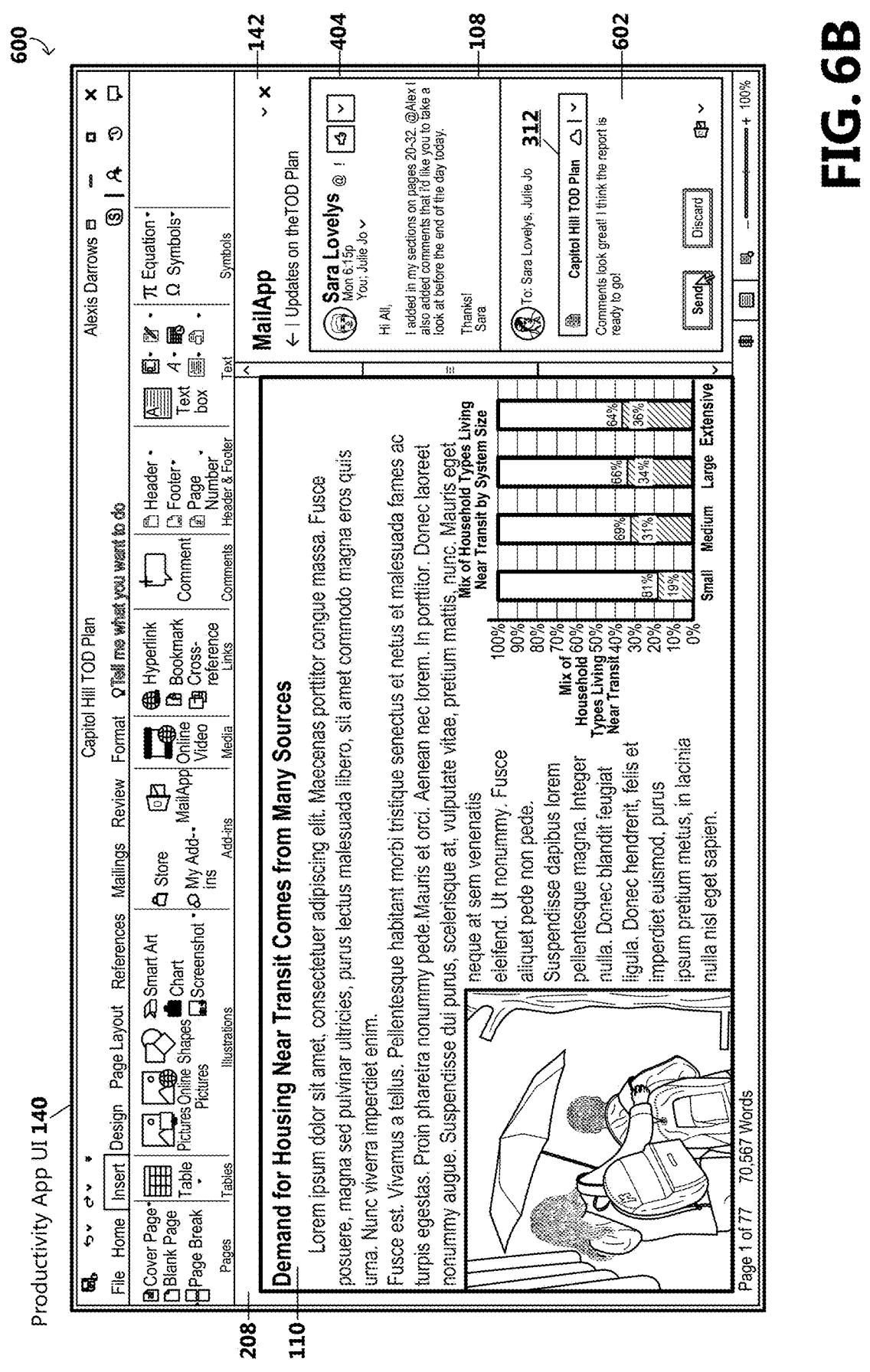

A fifth storyboard 600 illustrated in FIGS. 6A-B shows the user 116 adding a message 108 to a displayed conversation 404 through the communications pane 142 in the productivity application UI 140. As illustrated in FIG. 6A, the user 116 selects a messaging application functionality 210 provided in the communications pane 142, and enters textual content in a designated message input area for generating a reply message. According to an aspect and as illustrated in FIG. 6B, the attachment 110 is automatically attached to the reply message 602. In the illustrated example, the attachment 110 is a linked file, and a link 312 to the file is embedded in the reply message 602. When the user 116 selects to send the reply message 602, the link 312 is sent with the reply message to the one or more recipients associated with the conversation 404.

Figure 7A:
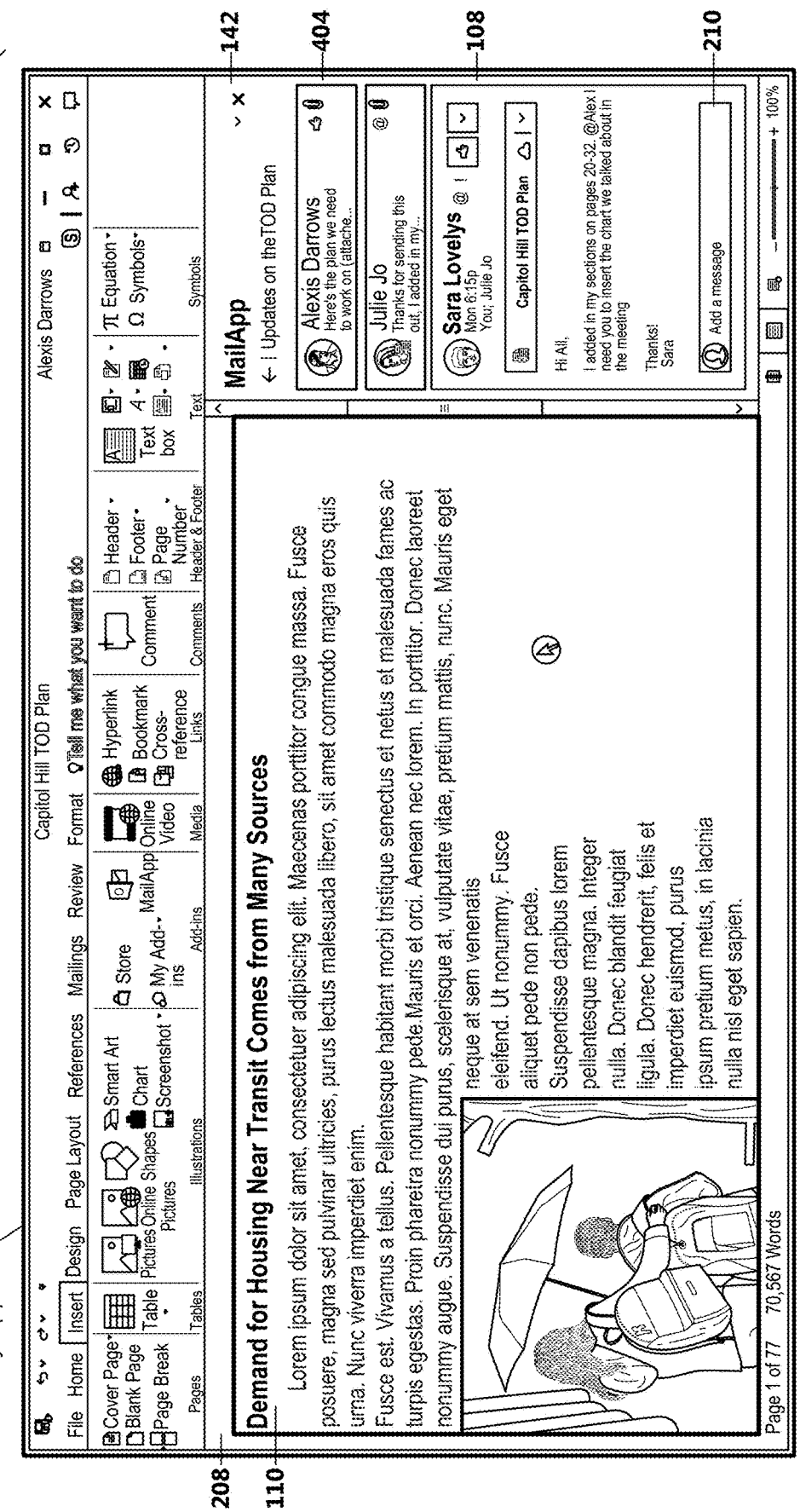
Figure 7B:
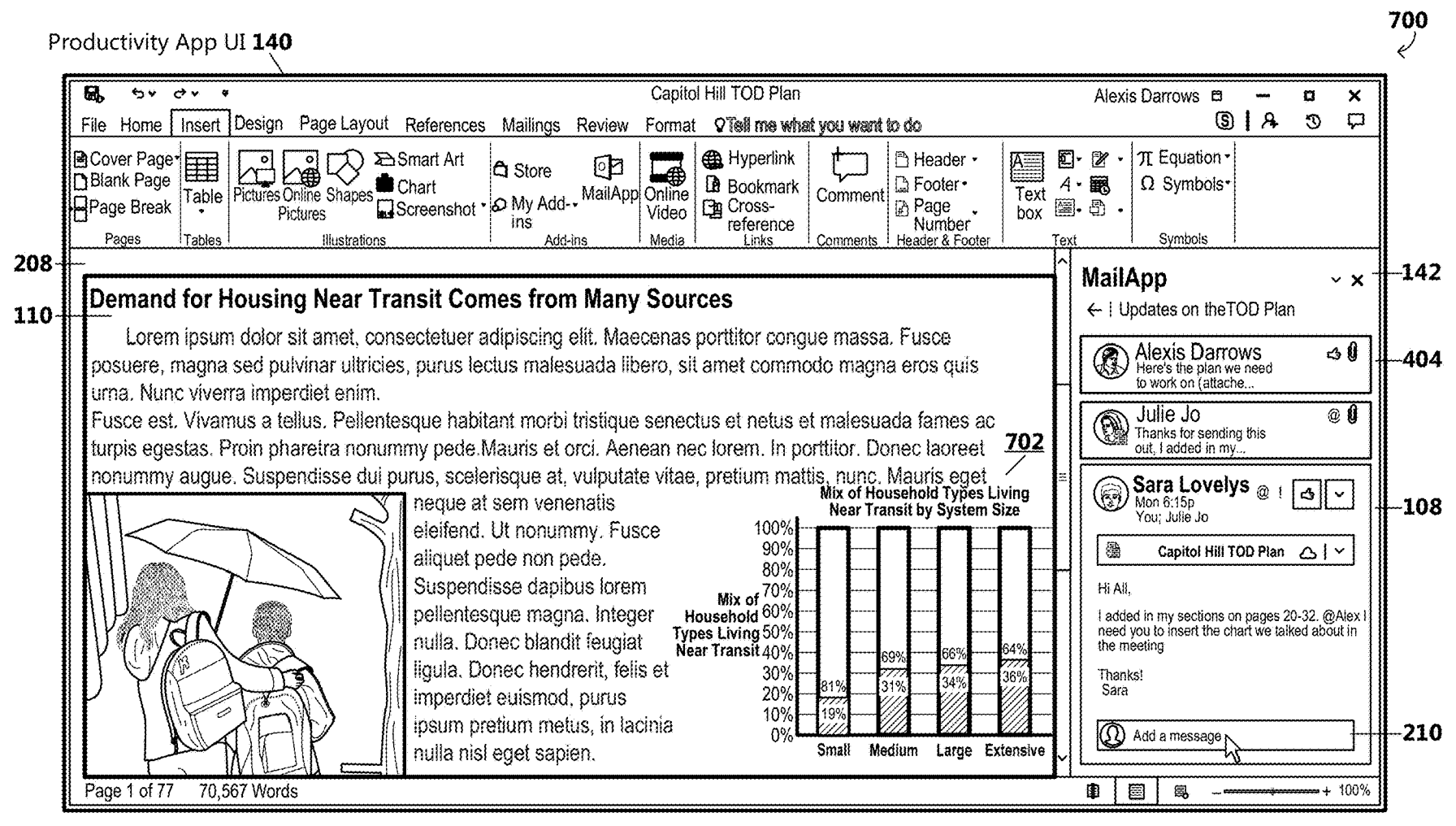
Figure 7C:
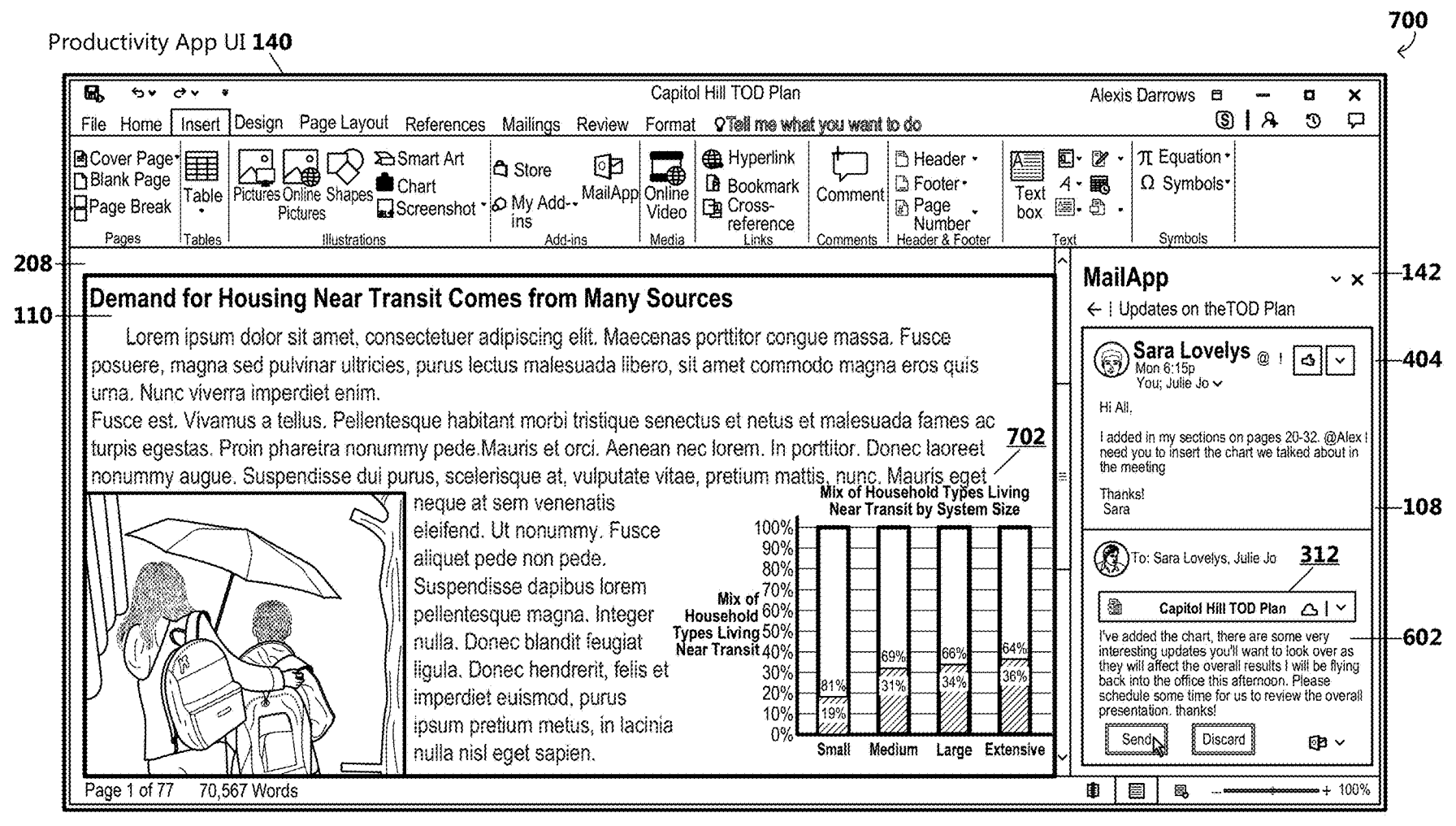

A sixth storyboard 700 illustrated in FIGS. 7A-C shows the user 116 modifying a linked file attachment 110 and replying to a displayed message 108 through the communications pane 142 in the productivity application UI 140. As illustrated in FIG. 7A, the user 116 selects the file displayed in the content display area 208 of the productivity application UI 140. According to an aspect, when the file is an embedded file attachment 110, an upload option 304 that enables the user to select to create and upload a copy 310 of the attachment 110 to a network share 118 or an edit option 306 that enables the user to select to create an editable copy of the attachment 110 in the message store 132 (as illustrated in FIG. 3C) are presented in the productivity application UI 140. In the illustrated example, the file is a linked file attachment 110.

With reference now to FIG. 7B, the user 116 makes changes 702 to the linked file attachment 110, such as adding content to the file. According to an aspect, changes 702 made to the linked file are saved to the master copy of the linked file stored in a network share 118. Additionally, the user 116 selects to add a reply message 602 to the conversation 404 displayed in the communications pane 142 in the productivity application UI 140.

As illustrated in FIG. 7C, the message content input by the user 116 and a link 312 to the modified linked file attachment 110 are included in the reply message 602. When the user 116 selects to send the reply message 602, the link 312 to the modified linked file attachment 110 is sent with the message 108 to one or more intended recipients. As should be appreciated, the examples illustrated in FIGS. 2A-7C are non-limiting examples; other GUIs with different elements and arrangements thereof may be used in conjunction with the present disclosure.

Figure 8A:
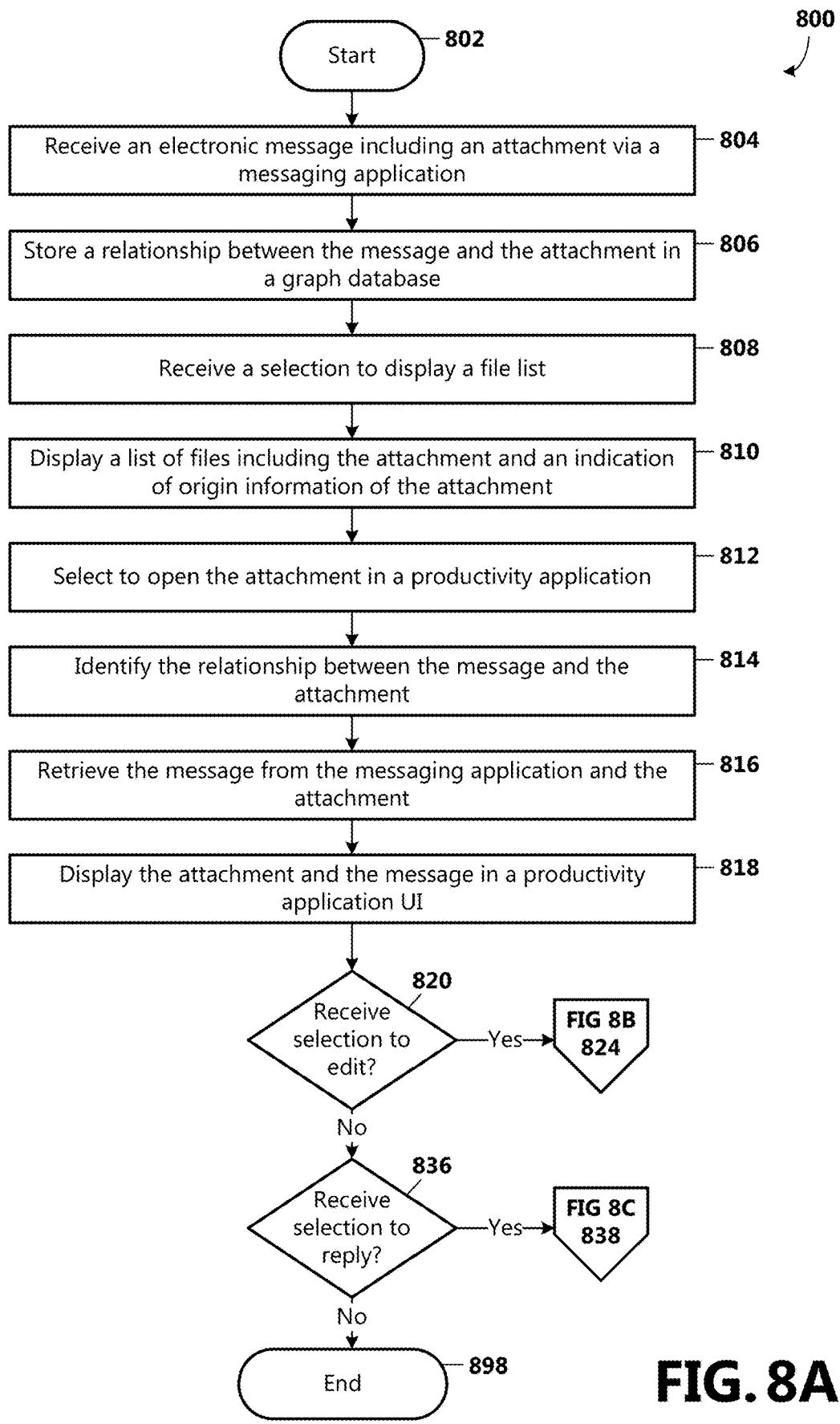
FIGS. 8A-C show a flow chart showing general stages involved in an example method for providing access to attachments of electronic messages and information associated with the electronic messages to applications external to a messaging application.
Figure 8B:
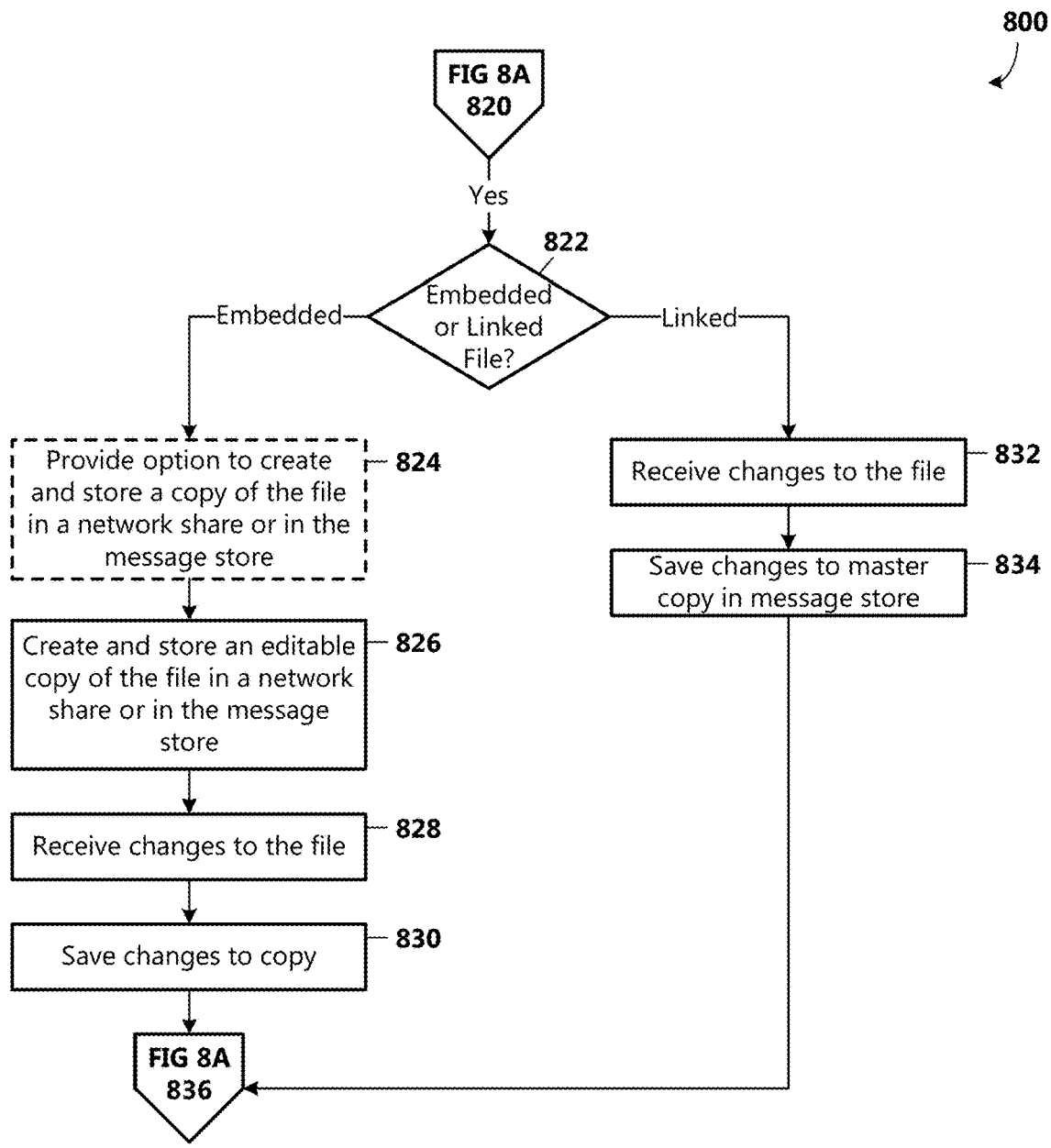
Figure 8C:
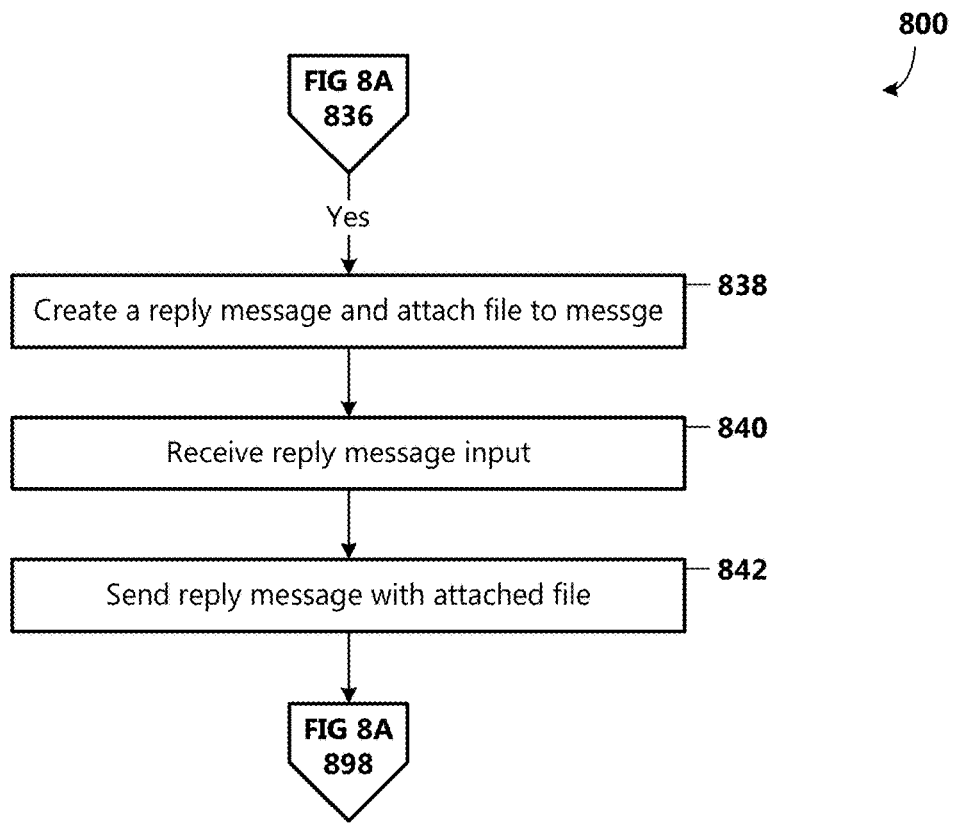

FIGS. 8A-C show a flow chart showing general stages involved in an example method 800 for providing access to attachments 110 of electronic messages 108 and information associated with the electronic messages to applications external to a messaging application 122. With reference now to FIG. 8A, the method 800 begins at START OPERATION 802, and proceeds to OPERATION 804, where an electronic message 108 comprising an attachment 110 is received via a messaging application 122, such as an email application, an instant messaging (IM) application, a short messaging service (SMS) application, a multimedia messaging service (MMS) application, a real-time information network (e.g. an interface for the TWITTER® message service) application, a social networking application, and the like. According to aspects, the attachment 110 may be an embedded file or a linked file.

The method 800 proceeds to OPERATION 806, where a relationship between the message 108 and the attachment 110 is stored in a graph database 112. In some examples, other messages 108 related to the message 108 (e.g., in a conversation 404) are received, and relationships between the other messages 108 and the attachment 110 are stored in the graph database 112.

After storing the relationship information in the graph database 112, the method 800 proceeds to OPERATION 808, where a selection to display a file list 204 is received. For example, the selection to display a file list 204 may be in associated with opening a file finder application 128, opening a productivity application 104, and the like.

At OPERATION 810, the file finder application 128 uses an API 126 to query the graph database 122 to identify files, including attachments 110, for inclusion in the particular file list 204. For example, the particular file list 204 may include files shared with the user 116, recent files, files responsive to a search criterion, etc. In some examples, the file finder application 128 further utilizes the API 126 to retrieve and display location or origin information associated with attachments 110. For example, location information can include a repository (e.g., local repositories 136, network shares 118, message stores 132) on or communicatively attached to the computing device 102 where an attachment 110 is stored. Origin information can include an indication of why an attachment 110 is included in a particular file list (e.g., shared with the user 116, recent files, files responsive to a search criterion) that is being displayed by the file finder application 128.

The method 800 proceeds to OPERATION 812, where a selection of an attachment 110 listed in the file list 204 is received. At OPERATION 814, a productivity application 104 downloads and opens the selected attachment 110. In some examples, the attachment 110 is an embedded file stored in the user's message store 132. Accordingly, the productivity application 104 downloads the attachment 110 from the message store 132. In other examples, the attachment 110 is a linked file, where a link 312 to a collaborative file stored in a network share 118 is embedded in the message 108. Accordingly, the productivity application 104 utilizes the link 312 to download the attachment 110 from the network share 118. Further, the productivity application 104 interacts with the graph database 112 to identify relationships associated with the attachment, and at OPERATION 816, related messages 108 are retrieved from the messaging application 122.

The method 800 proceeds to OPERATION 818, where the attachment 110 is displayed in a content display area 208 in the productivity application UI 140, and one or more related messages 108 are displayed in a communications pane 142 in the productivity application UI 140. In some examples, the one or more related messages 108 are part of a conversation 404, and the messages 108 that comprise the conversation 404 are displayed in the communications pane 142. Further, at least a limited set of messaging application functionalities 210 are provided in the communications pane 142.

At DECISION OPERATION 820, a determination is made as to whether a selection to edit content of the attachment 110 is received. When a determination is made that a selection to edit attachment file content is received, the method 800 proceeds to DECISION OPERATION 824 in FIG. 8B, where a determination is made as to whether the attachment 110 is an embedded file or a linked file. When the attachment 110 is an embedded file, the method 800 proceeds to OPTIONAL OPERATION 824, where an upload option 306 is presented to the user 116 that enables the user 116 to select to create and upload a copy 310 of the attachment 110 to a network share 118. Additionally, an edit option 306 can be presented that enables the user 116 to select to create an editable copy 310 of the attachment 110 in the message store 132. At OPTIONAL OPERATION 824, a selection of the upload option 306 or the edit option 306 may be received.

The method 800 continues to OPERATION 826, where an editable copy 310 of the attachment 110 is created and stored in a network share 118 or in the message store 132. In some examples, the storage location is based on a selection made by the user at OPTIONAL OPERATION 824. At OPERATION 828, changes 702 are made to the editable attachment copy 310, and at OPERATION 830, the changes are saved to the copy 310.

When a determination is made at DECISION OPERATION 822 that the attachment 110 is a linked file, the method 800 proceeds to OPERATION 832, where changes 702 are made to attachment 110, and at OPERATION 830, the changes are saved to the master copy of the attachment 110 stored in a network share 118.

The method 800 then continues from OPERATION 830, 834, or DECISION OPERATION 820 to DECISION OPERATION 836 in FIG. 8A, where a determination is made as to whether a selection to add a reply message 602 to a message 108 or conversation 404 displayed in the communications pane 142 is received. When a determination is made that a selection to reply to the message 108 or conversation 404 is received, the method 800 proceeds to OPERATION 838 in FIG. 8C, where a reply message 602 is generated, and the attachment 110 (or the editable attachment copy 310 when changes 702 are made to an embedded file attachment) is attached to the reply message 602. According to an aspect, when the attachment 110 or editable attachment copy 310 is stored in a network share 118, a link 312 to the file is attached to the reply message 602. According to another aspect, when the attachment 110 or editable attachment copy 310 is stored in a message store 132, a copy of the file is embedded in the reply message 602.

The method 800 proceeds to OPERATION 840, where reply message input is received, and at OPERATION 842, the reply message 602, including the attachment 110 or attachment copy 310, is sent via the messaging application 122 to one or more intended recipients. In some examples, the user 116 may wish to utilize expanded messaging application functionalities. Accordingly, the user 116 may selectively launch the messaging application 122, and the reply message 602 including the attachment 110 or attachment copy 310 is displayed in the messaging application UI 402. The method 800 ends at OPERATION 898.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 9:
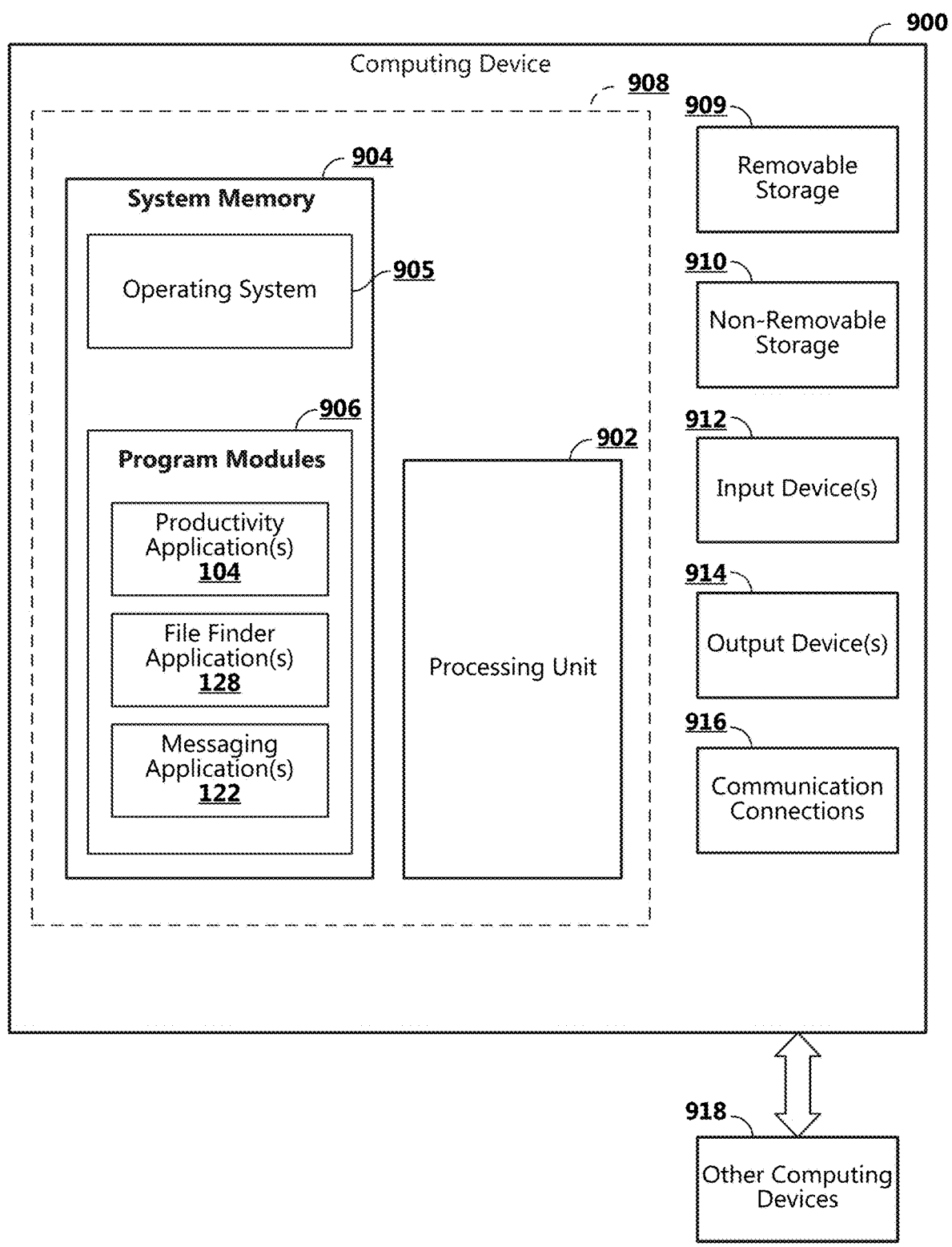
FIG. 9 is a block diagram illustrating example physical components of a computing device.
Figure 10A:
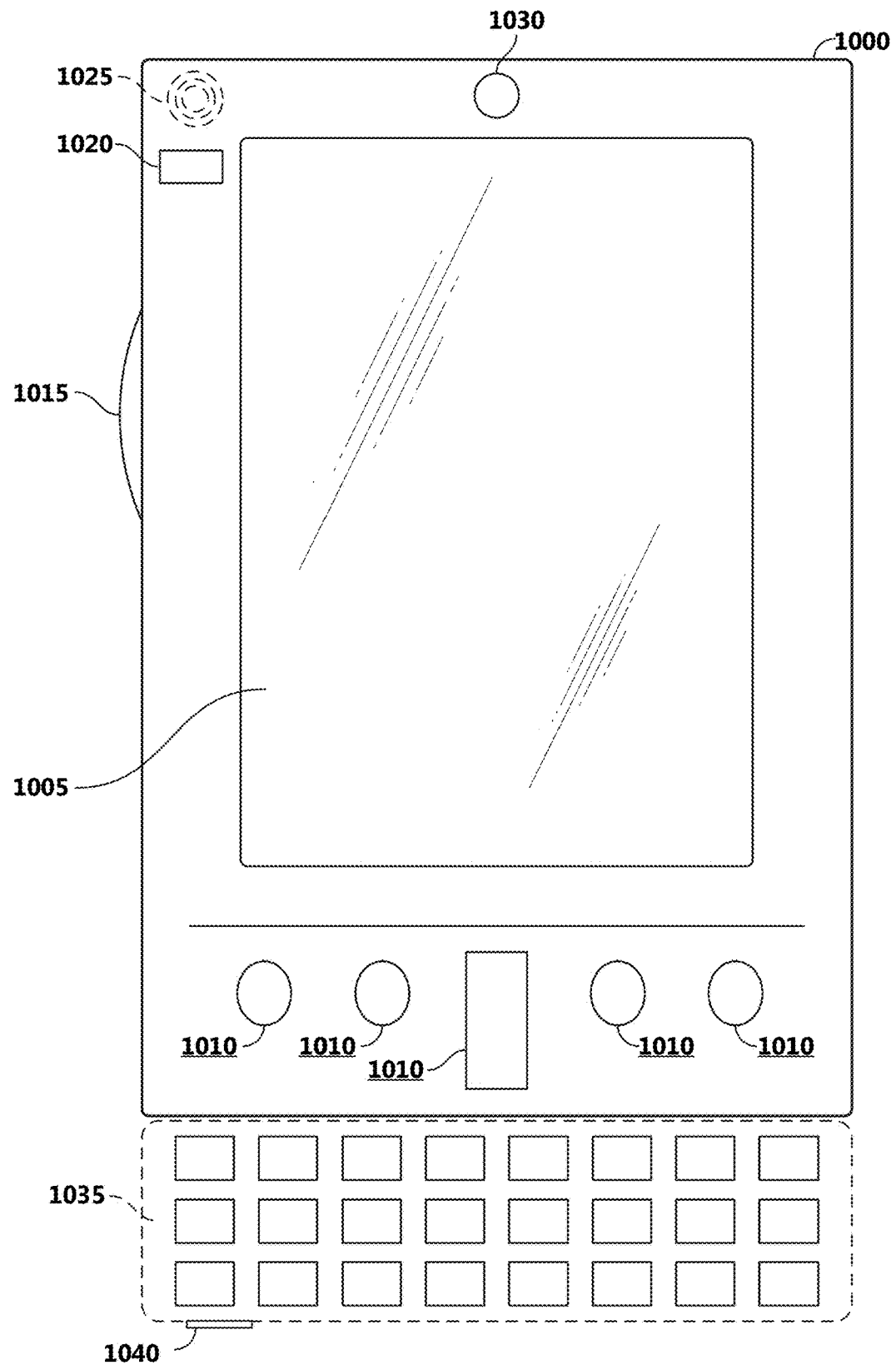
FIGS. 10A and 10B are block diagrams of a mobile computing device.
Figure 10B:
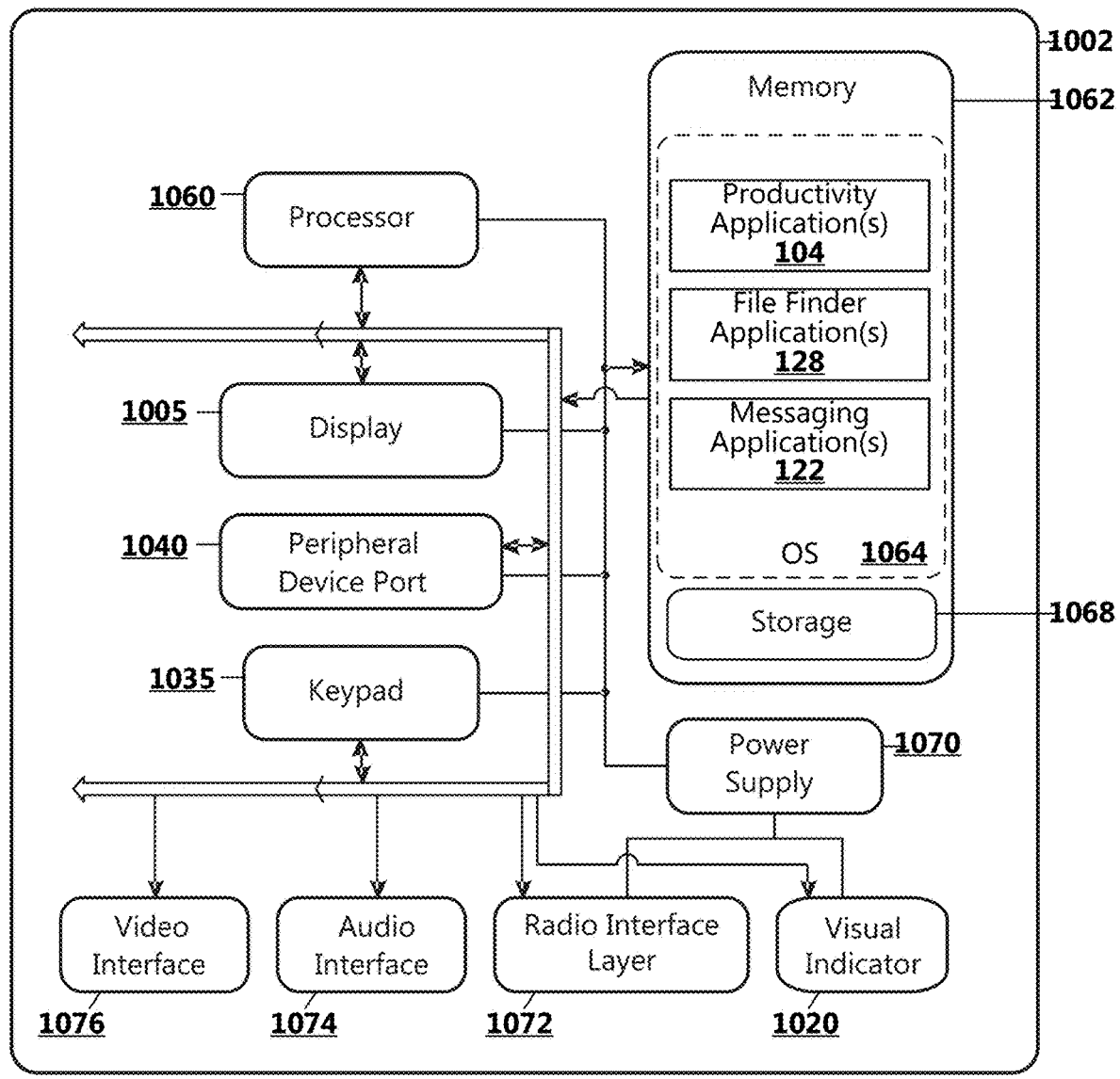
Figure 11:
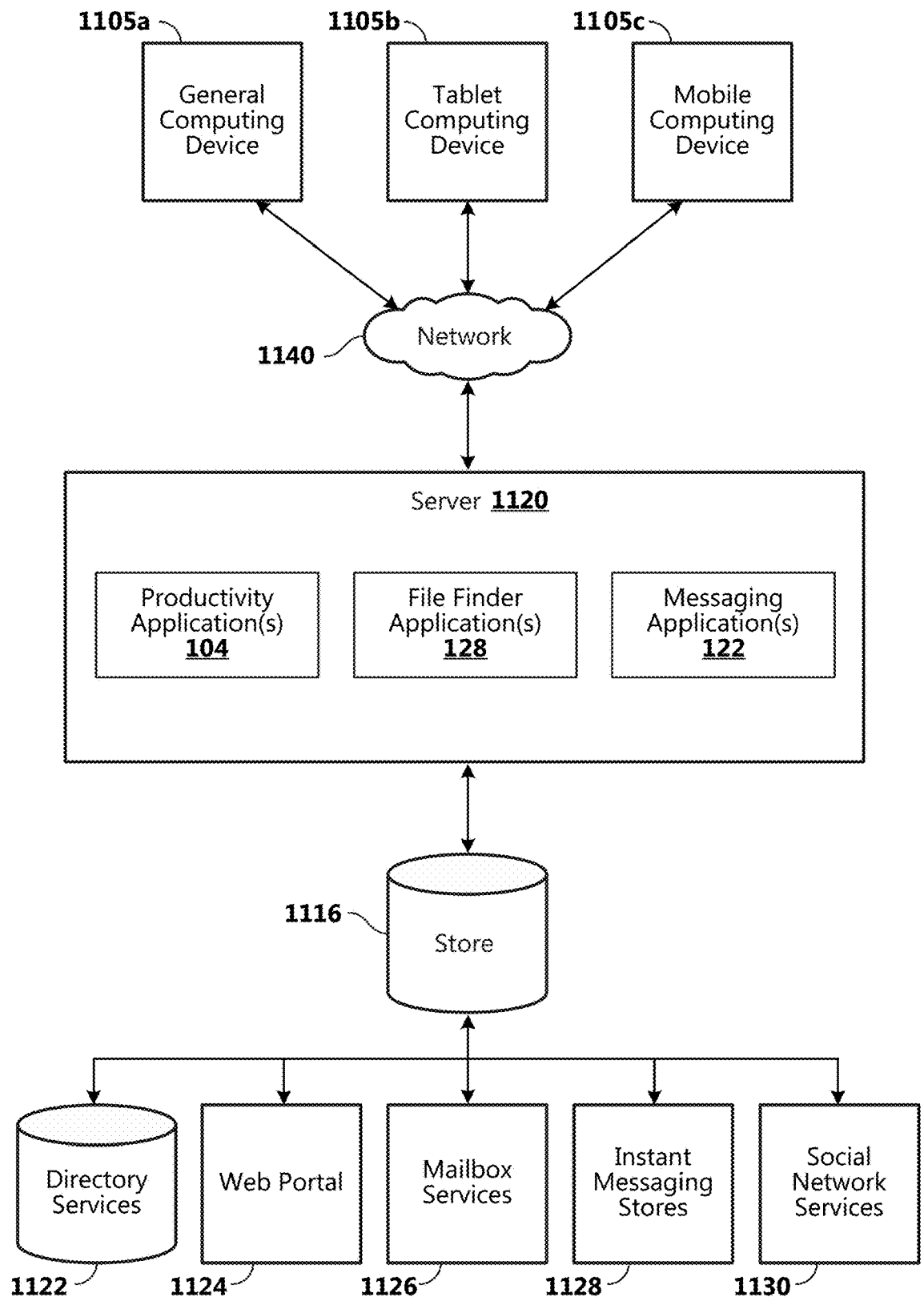
FIG. 11 is a block diagram of a distributed computing system.

FIGS. 9-11 and the associated descriptions provide a discussion of a variety of operating environments in which examples are practiced. However, the devices and systems illustrated and discussed with respect to FIGS. 9-11 are for purposes of example and illustration and are not limiting of a vast number of computing device configurations that are utilized for practicing aspects, described herein.

FIG. 9 is a block diagram illustrating physical components (i.e., hardware) of a computing device 900 with which examples of the present disclosure are be practiced. In a basic configuration, the computing device 900 includes at least one processing unit 902 and a system memory 904. According to an aspect, depending on the configuration and type of computing device, the system memory 904 comprises, but is not limited to, volatile storage (e.g., random access memory), non-volatile storage (e.g., read-only memory), flash memory, or any combination of such memories. According to an aspect, the system memory 904 includes an operating system 905 and one or more program modules 906 suitable for running software applications. According to an aspect, the system memory 904 includes a messaging application 122, a file finder application 128, and a productivity application 104. The operating system 905, for example, is suitable for controlling the operation of the computing device 900. Furthermore, aspects are practiced in conjunction with a graphics library, other operating systems, or any other application program, and is not limited to any particular application or system. This basic configuration is illustrated in FIG. 9 by those components within a dashed line 908. According to an aspect, the computing device 900 has additional features or functionality. For example, according to an aspect, the computing device 900 includes additional data storage devices (removable and/or non-removable) such as, for example, magnetic disks, optical disks, or tape. Such additional storage is illustrated in FIG. 9 by a removable storage device 909 and a non-removable storage device 910.

As stated above, according to an aspect, a number of program modules and data files are stored in the system memory 904. While executing on the processing unit 902, the program modules 906 (e.g., a messaging application 122, a file finder application 128, and a productivity application 104) perform processes including, but not limited to, one or more of the stages of the method 800 illustrated in FIGS. 8A-C. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 9 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 900 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 900 has one or more input device(s) 912 such as a keyboard, a mouse, a pen, a sound input device, a touch input device, etc. The output device(s) 914 such as a display, speakers, a printer, etc. are also included according to an aspect. The aforementioned devices are examples and others may be used. According to an aspect, the computing device 900 includes one or more communication connections 916 allowing communications with other computing devices 918. Examples of suitable communication connections 916 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 904, the removable storage device 909, and the non-removable storage device 910 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 900. According to an aspect, any such computer storage media is part of the computing device 900. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 10A and 10B illustrate a mobile computing device 1000, for example, a mobile telephone, a smart phone, a tablet personal computer, a laptop computer, and the like, with which aspects may be practiced. With reference to FIG. 10A, an example of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. According to an aspect, the display 1005 of the mobile computing device 1000 functions as an input device (e.g., a touch screen display). If included, an optional side input element 1015 allows further user input. According to an aspect, the side input element 1015 is a rotary switch, a button, or any other type of manual input element. In alternative examples, mobile computing device 1000 incorporates more or less input elements. For example, the display 1005 may not be a touch screen in some examples. In alternative examples, the mobile computing device 1000 is a portable phone system, such as a cellular phone. According to an aspect, the mobile computing device 1000 includes an optional keypad 1035. According to an aspect, the optional keypad 1035 is a physical keypad. According to another aspect, the optional keypad 1035 is a "soft" keypad generated on the touch screen display. In various aspects, the output elements include the display 1005 for showing a graphical user interface (GUI), a visual indicator 1020 (e.g., a light emitting diode), and/or an audio transducer 1025 (e.g., a speaker). In some examples, the mobile computing device 1000 incorporates a vibration transducer for providing the user with tactile feedback. In yet another example, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 1000 incorporates peripheral device port 1040, such as an audio input (e.g., a microphone jack), an audio output (e.g., a headphone jack), and a video output (e.g., a HDMI port) for sending signals to or receiving signals from an external device.

FIG. 10B is a block diagram illustrating the architecture of one example of a mobile computing device. That is, the mobile computing device 1000 incorporates a system (i.e., an architecture) 1002 to implement some examples. In one example, the system 1002 is implemented as a "smart phone" capable of running one or more applications (e.g., browser, e-mail, calendaring, contact managers, messaging clients, games, and media clients/players). In some examples, the system 1002 is integrated as a computing device, such as an integrated personal digital assistant (PDA) and wireless phone.

According to an aspect, one or more application programs 1050 are loaded into the memory 1062 and run on or in association with the operating system 1064. Examples of the application programs include phone dialer programs, e-mail programs, personal information management (PIM) programs, word processing programs, spreadsheet programs, Internet browser programs, messaging programs, and so forth. According to an aspect, a messaging application 122, a file finder application 128, and a productivity application 104 are loaded into memory 1062. The system 1002 also includes a non-volatile storage area 1068 within the memory 1062. The non-volatile storage area 1068 is used to store persistent information that should not be lost if the system 1002 is powered down. The application programs 1050 may use and store information in the non-volatile storage area 1068, such as e-mail or other messages used by an e-mail application, and the like. A synchronization application (not shown) also resides on the system 1002 and is programmed to interact with a corresponding synchronization application resident on a host computer to keep the information stored in the non-volatile storage area 1068 synchronized with corresponding information stored at the host computer. As should be appreciated, other applications may be loaded into the memory 1062 and run on the mobile computing device 1000.

According to an aspect, the system 1002 has a power supply 1070, which is implemented as one or more batteries. According to an aspect, the power supply 1070 further includes an external power source, such as an AC adapter or a powered docking cradle that supplements or recharges the batteries.

According to an aspect, the system 1002 includes a radio 1072 that performs the function of transmitting and receiving radio frequency communications. The radio 1072 facilitates wireless connectivity between the system 1002 and the "outside world," via a communications carrier or service provider. Transmissions to and from the radio 1072 are conducted under control of the operating system 1064. In other words, communications received by the radio 1072 may be disseminated to the application programs 1050 via the operating system 1064, and vice versa.

According to an aspect, the visual indicator 1020 is used to provide visual notifications and/or an audio interface 1074 is used for producing audible notifications via the audio transducer 1025. In the illustrated example, the visual indicator 1020 is a light emitting diode (LED) and the audio transducer 1025 is a speaker. These devices may be directly coupled to the power supply 1070 so that when activated, they remain on for a duration dictated by the notification mechanism even though the processor 1060 and other components might shut down for conserving battery power. The LED may be programmed to remain on indefinitely until the user takes action to indicate the powered-on status of the device. The audio interface 1074 is used to provide audible signals to and receive audible signals from the user. For example, in addition to being coupled to the audio transducer 1025, the audio interface 1074 may also be coupled to a microphone to receive audible input, such as to facilitate a telephone conversation. According to an aspect, the system 1002 further includes a video interface 1076 that enables an operation of an on-board camera 1030 to record still images, video stream, and the like.

According to an aspect, a mobile computing device 1000 implementing the system 1002 has additional features or functionality. For example, the mobile computing device 1000 includes additional data storage devices (removable and/or non-removable) such as, magnetic disks, optical disks, or tape. Such additional storage is illustrated in FIG. 10B by the non-volatile storage area 1068.

According to an aspect, data/information generated or captured by the mobile computing device 1000 and stored via the system 1002 is stored locally on the mobile computing device 1000, as described above. According to another aspect, the data is stored on any number of storage media that is accessible by the device via the radio 1072 or via a wired connection between the mobile computing device 1000 and a separate computing device associated with the mobile computing device 1000, for example, a server computer in a distributed computing network, such as the Internet. As should be appreciated such data/information is accessible via the mobile computing device 1000 via the radio 1072 or via a distributed computing network. Similarly, according to an aspect, such data/information is readily transferred between computing devices for storage and use according to well-known data/information transfer and storage means, including electronic mail and collaborative data/information sharing systems.

FIG. 11 illustrates one example of the architecture of a system for providing access to attachments 110 as described above. Content developed, interacted with, or edited in association with a messaging application 122, a file finder application 128, or a productivity application 104 is enabled to be stored in different communication channels or other storage types. For example, various documents may be stored using a directory service 1122, a web portal 1124, a mailbox service 1126, an instant messaging store 1128, or a social networking site 1130. The messaging application 122, file finder application 128, or productivity application 104 are operative to use any of these types of systems or the like for providing access to attachments 110, as described herein. According to an aspect, a server 1120 provides a messaging application 122, a file finder application 128, or a productivity application 104 to clients 1105a,b,c. As one example, the server 1120 is a web server providing a messaging application 122, a file finder application 128, or a productivity application 104 over the web. The server 1120 provides a messaging application 122, a file finder application 128, or a productivity application 104 over the web to clients 1105 through a network 1110. By way of example, the client computing device is implemented and embodied in a personal computer 1105a, a tablet computing device 1105b or a mobile computing device 1105c (e.g., a smart phone), or other computing device. Any of these examples of the client computing device are operable to obtain content from the store 1116.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A computer-implemented method for providing access to an attachment of an electronic message to an application external to a messaging application, comprising:
   receiving an electronic message via a messaging application, the received electronic message including a file attachment;
   storing, in a graph database, data representative of the file attachment, the electronic message, and a relationship between the file attachment and the electronic message;
   including the file attachment in a file list of files shared via a plurality of received electronic messages;
   receiving a selection of the file attachment from the file list;
   interacting with the graph database to identify the relationship between the selected file attachment and at least one of the plurality of electronic messages;
   retrieving the selected file attachment from a storage location;
   retrieving the at least one electronic message identified as related to the selected file attachment; and
   causing display, in a productivity application user interface, of the selected file attachment in a content display area and the at least one related electronic message in a communications pane.

2. The method of claim 1, wherein the file list is generated utilizing origin information to identify one or more files to include in the file list, the origin information indicating whether a file is an attachment.

3. The method of claim 2, further comprising utilizing the origin information to identify whether an attachment is an embedded attachment stored in a message store or a linked attachment stored in a network share.

4. The method of claim 2, wherein utilizing the origin information comprises:
   utilizing metadata to identify the one or more files to include in the file list; or
   using an application programming interface to interact with the graph database to identify the one or more files to include in the file list.

5. The method of claim 2, further comprising causing display of the origin information in the file list.

6. The method of claim 1, wherein interacting with the graph database comprises using an application programming interface to interact with the graph database.

7. The method of claim 1, further comprising providing one or more messaging application functionalities in the communications pane.

8. The method of claim 7, wherein providing the one or more messaging application functionalities in the communications pane comprising:
providing an option to launch the messaging application; and
communicating with the messaging application for launching the messaging application and attaching the selected file attachment to a reply message.

9. The method of claim 7, further comprising:
receiving a selection to edit the selected file attachment;
when the selected file attachment is an embedded file stored in a message store, creating an editable copy of the selected file attachment; and
receiving a change to the editable copy of the selected file attachment.

10. The method of claim 9, wherein prior to creating the editable copy of the selected file attachment, providing at least one of:
an upload option for enabling a user to create the editable copy of the selected file attachment and store the editable copy in a network share; and
an edit option for enabling a user to create the editable copy of the selected file attachment and store the editable copy in a message store.

11. The method of claim 9, wherein:
causing display of the one or more messaging application functionalities comprises causing display of an option to add a message; and
responsive to receiving a selection of the option to add a message:
generating a reply message;
attaching the editable copy of the selected file attachment to the reply message;
receiving reply message content; and
sending the reply message and the attached editable copy of the selected file attachment to one or more intended recipients.

12. The method of claim 10, wherein attaching the editable copy of the selected file attachment to the reply message comprises:
when the editable copy of the selected file attachment is stored in a message store:
creating a link to the editable copy of the selected file attachment; and
embedding the link in the reply message.

13. A system for providing access to an attachment of an electronic message to an application external to a messaging application, the system comprising a computing device, the computing device comprising:
at least one processing device; and
at least one computer storage media storing instructions that, when executed by the at least one processing device, enable the computing device to:
receive an electronic message via a messaging application, the received electronic message including a file attachment;
store, in a graph database, data representative of the file attachment, the electronic message, and a relationship between the file attachment and the electronic message;
include the file attachment in a file list of files shared via a plurality of received electronic messages;
receive a selection of the file attachment from the file list;
interact with the graph database to identify the relationship between the selected file attachment and at least one of the plurality of electronic messages;
retrieve the selected file attachment from a storage location;
retrieve the at least one electronic message identified as related to the selected file attachment; and
cause display, in a productivity application user interface, of the selected file attachment in a content display area and the at least one related electronic message in a communications pane.

14. The system of claim 13, wherein the file list comprises is generated by interacting with the graph database via an application programming interface to identify origin information associated with the file attachment.

15. The system of claim 14, wherein the origin information indicates whether the file attachment is an embedded file stored in a message store or a linked file stored in a network share.

16. The system of claim 13, wherein the system is further operative to provide one or more messaging application functionalities in the communications pane.

17. The system of claim 16, wherein the system is further operative to:
receive a selection to edit the selected file attachment;
when the selected file attachment is an embedded file stored in a message store, create an editable copy of the selected file attachment; and
receive a change to the editable copy of the selected file attachment.

18. The system of claim 17, wherein prior to creating the editable copy of the selected file attachment, the system if further operative to provide at least one of:
an upload option for enabling a user to create the editable copy of the selected file attachment and store the editable copy in a network share; and
an edit option for enabling a user to create the editable copy of the selected file attachment and store the editable copy in a message store.

19. The system of claim 17, wherein:
responsive to causing display of the one or more messaging application functionalities, the system is operative to display an option to add a message; and
responsive to a selection of the option to add a message, the system is operative to:
generate a reply message;
attach the editable copy of the selected file attachment to the reply message;
receive reply message content; and
send the reply message and the attached editable copy of the selected file attachment to one or more intended recipients.

20. Computer storage media including computer readable instructions, which when executed by a processing unit is operative to:
receive an electronic message via a messaging application, the received electronic message including a file attachment;
store, in a graph database, data representative of the file attachment, the electronic message, and a relationship between the file attachment and the electronic message;
include the file attachment in a file list of files shared via a plurality of received electronic messages;

receive a selection of the file attachment from the file list;
interact with the graph database to identify the relationship between the selected file attachment and at least one of the plurality of electronic messages;
retrieve the selected file attachment from a storage location;
retrieve the at least one electronic message identified as related to the selected file attachment; and
cause display, in a productivity application user interface, of the selected file attachment in a content display area and the at least one related electronic message and messaging application functionalities in a communications pane.

\* \* \* \* \*